United States Patent
Harshwal et al.

(10) Patent No.: US 12,554,760 B1
(45) Date of Patent: Feb. 17, 2026

(54) SYSTEM AND METHOD FOR DISPLAYING DATA SETS ON A USER INTERFACE

(71) Applicant: HARSHWAL ADVISORY LLC, Poway, CA (US)

(72) Inventors: Abhi Harshwal, Poway, CA (US); Adi Harshwal, Poway, CA (US)

(73) Assignee: Harshwal Advisory LLC, Poway, CA (US)

( * ) Notice: Subject to any disclaimer, the term of this patent is extended or adjusted under 35 U.S.C. 154(b) by 0 days.

(21) Appl. No.: 19/341,531

(22) Filed: Sep. 26, 2025

(51) Int. Cl.
- G06F 16/34 (2025.01)
- G06F 16/2458 (2019.01)
- G06F 16/583 (2019.01)
- G06Q 20/40 (2012.01)
- G06Q 40/03 (2023.01)

(52) U.S. Cl.
CPC .......... *G06F 16/34* (2019.01); *G06F 16/2471* (2019.01); *G06F 16/5846* (2019.01); *G06Q 20/4016* (2013.01); *G06Q 40/0325* (2025.08)

(58) Field of Classification Search
CPC .. G06F 16/2471; G06F 16/2477; G06F 16/34; G06F 16/53; G06F 16/5846; G06F 16/5838; G06Q 20/4016; G06Q 40/0325
See application file for complete search history.

(56) References Cited

U.S. PATENT DOCUMENTS

| | | | |
|---|---|---|---|
| 2005/0289182 A1* | 12/2005 | Pandian | G06Q 10/10 |
| 2015/0213450 A1* | 7/2015 | Petersen | G06Q 20/306 705/44 |
| 2019/0122226 A1* | 4/2019 | Ekambaram | H04L 63/1408 |
| 2022/0164886 A1* | 5/2022 | Fernandez Stuyck | G06Q 40/06 |
| 2024/0161108 A1* | 5/2024 | Madisetti | H04L 9/3268 |
| 2025/0086598 A1* | 3/2025 | Foster | G06Q 20/108 |

FOREIGN PATENT DOCUMENTS

| | | | | |
|---|---|---|---|---|
| CN | 120337895 A | * | 7/2025 | G06Q 40/125 |
| WO | WO-2018227848 A1 | * | 12/2018 | G06Q 40/125 |

* cited by examiner

*Primary Examiner* — James E Richardson
(74) *Attorney, Agent, or Firm* — Knobbe, Martens, Olson & Bear, LLP

(57) ABSTRACT

Proposed is a method and system for displaying data sets on a user interface. The system may retrieve first, second and third datasets from a plurality of databases. The system may then analyze the datasets to determine anomalies and fraud indicators in the datasets. The system may then generate and display an anomaly alert and a fraud alert respectively on first and second areas of a user interface. The system may display a first set of review data on a third area of the user interface. The system may receive a second set of review data and generate a final audit report on a fourth area of the user interface. The system may display an indication of the final audit report on a fourth area of the user interface such that information contained in the first to fourth areas is simultaneously visible via a same display screen.

20 Claims, 17 Drawing Sheets

Uncleared checks and payments as of 12/31/2023

| DATE | TYPE | REF NO | PAYEE | AMOUNT (USD) |
|---|---|---|---|---|
| 09/06/2021 | Bill Payment | 1433 | Confederated Tribes of the U... | -100.00 |
| 10/26/2021 | Bill Payment | 1852 | Peterson, Elizabeth Anne | -9.16 |
| 01/27/2023 | Bill Payment | 4546 | Barkley Jr., John A | -13.07 |
| 02/09/2023 | Expense | Prime E&O '22 Audit | Community Bank | -402.04 |
| 04/11/2023 | Bill Payment | 4992 | Farrow, Burke Jackson | -50.00 |
| 05/10/2023 | Bill Payment | 5147 | Spencer, Brosnan Dale-Sue | -574.93 |
| 11/22/2023 | Bill Payment | 6204 | Arnoux, Dakota Dawn | -2,371.82 |
| 12/13/2023 | Bill Payment | 6284 | Elk III, William Joseph | -2,500.00 |
| 12/15/2023 | Bill Payment | 6324 | Tarrastshkt Cultural Institute | -324.00 |
| 12/18/2023 | Expense | 3132 | Oweesta Corporation | -307.50 |
| 12/20/2023 | Bill Payment | 6337 | CTUIR Housing | -1,260.00 |
| 12/22/2023 | Bill Payment | 6352 | CTUIR Housing | -413.00 |
| 12/22/2023 | Bill Payment | 6358 | Heath, Rebecca Sue | -2,000.00 |

FIG. 3A

Uncleared Checks and Payments

| Amount | Payee | Reference number | Date | Type |
|---|---|---|---|---|
| -1,260.00 | CTUIR Housing | 8337 | 12/20/2023 | Bill Payment |
| -413.00 | CTUIR Housing | 8352 | 12/22/2023 | Bill Payment |
| -2,000.00 | Heath, Rebecca Sue | 8356 | 12/22/2023 | Bill Payment |
| -635.01 | Watchman, Raymond Lee | 8379 | 12/27/2023 | Bill Payment |
| -752.28 | LaMere, Jason Gilbert | 8369 | 12/27/2023 | Bill Payment |
| -2,335.66 | Lawson, Raven Nicole | 8370 | 12/27/2023 | Bill Payment |
| -3,092.52 | Looney, Derek James Ray | 8371 | 12/27/2023 | Bill Payment |

INCONSISTENCIES — 422

| Category | Budgeted Amount | GL Amount |
|---|---|---|
| Office Supplies | $5,000 | $5,000 |
| Travel | $10,000 | $9,500 |
| Equipment | $12,000 | $12,000 |

424 — Budgeted Amount
426 — GL Amount
428B — Travel row
428

Alerts

462 ⚠ Weekend Transaction >
5 Transactions

464 ⚠ Multiple Small Vendors >
12 Transactions

466 ⚠ Unusual Invoice Pattern >
3 Transactions

468 ⚠ Duplicate Payments >
2 Transactions

FIG. 4G

SYSTEM AND METHOD FOR DISPLAYING DATA SETS ON A USER INTERFACE

BACKGROUND

Technical Field

The described technology generally relates to data processing, and more particularly, to artificial intelligence (AI) based systems and methods for processing different types of data and efficiently displaying processed data on a user interface.

Description of Related Technology

Graphical user interfaces (GUIs) can be used for displaying a variety of information. Depending on the size of a user terminal, GUIs can include more information for display or less information for display.

SUMMARY

The systems, methods, and devices of this disclosure each have several innovative aspects, no single one of which is solely responsible for all of the desirable attributes disclosed herein. Without limiting the scope of the appended claims, some prominent features are described herein.

In some aspects, the techniques described herein relate to a computer-implemented method to be performed by a server for displaying data sets on a user interface, the method including: storing, in a memory of the server, a final report template and a plurality of templates respectively including a plurality of different sets of template data, the plurality of different sets of template data including a first set of template data and a second set of template data different from the first set of template data; providing a first database storing a first data set including past financial data of a first user; establishing a first communication link with a second database storing a second data set including public financial information of the first user; receiving, by a first communication interface of the server, the second data set from the second database; establishing a second communication link with a user terminal of the first user; receiving, by a second communication interface of the server, a third data set from the user terminal, the third data set including current financial data of the first user; comparing, by a processor of the server, the plurality of different sets of template data with the first data set, the second data set, and the third data set; selecting, by the processor, a plurality of subsets of data from each of the first data set, the second data set, and the third data set that are similar to at least one of the plurality of different sets of template data, the plurality of subsets of data having an image data format; converting, by the processor, the selected plurality of subsets of data having the image data format into machine readable text, the machine readable text including a first set of machine readable text associated with the first set of template data and a second set of machine readable text associated with the second set of template data; determining whether the machine readable text contains at least one of the plurality of different sets of template data; in response to determining that the machine readable text contains at least one of the plurality of different sets of template data, validating the machine readable text; selecting, by the processor, a first set of validated machine readable text from the validated machine readable text associated with the first set of template data and a second set of validated machine readable text from the validated machine readable text associated with the second set of template data; determining, by the processor, one or more trends in the validated machine readable text based on a comparison of the first set of validated machine readable text and the second set of validated machine readable text, wherein the one or more trends include: one or more changes over time between the first set of validated machine readable text and the second set of validated machine readable text, or one or more inconsistencies between the first set of validated machine readable text and the second set of validated machine readable text; determining, by the processor, one or more anomalies in the validated machine readable text, wherein determining the one or more anomalies includes: determining, by the processor, outlier data from the validated machine readable text, wherein the outlier data is selected from the one or more changes or one or more inconsistencies above a threshold, and determining, by the processor, inconsistent data from the validated machine readable text, wherein the inconsistent data is inconsistent with a set of predetermined rules; determining, by the processor, one or more fraud indicators in the validated machine readable text, the one or more fraud indicators containing data that is commonly associated with fraud or the determined one or more trends includes an unexplained change in the data; generating, by the processor, an anomaly alert for each of the determined one or more anomalies; generating, by the processor, a fraud alert for each of the determined one or more fraud indicators; displaying, by the processor, the anomaly alerts on a first area of the user interface; displaying, by the processor, the fraud alerts on a second area of the user interface, wherein the second area of the user interface is different than the first area; receiving a first set of review data, by a third communication interface of the server, from an auditor computer; incorporating the first set of review data into a third area of the user interface different from the first and second areas; based on a final report template, automatically generating, by the processor, a final draft report by combining the first set of review data, the anomaly alerts, and the fraud alerts in the final report template; incorporating the final draft report into a fourth area of the user interface different from the first, second, and third areas; receiving a second set of review data by the user interface from the auditor computer; modifying the final draft report based on the second set of review data to generate final report; incorporating the second set of review data into a fifth area of the user interface different from the first to fourth areas; and displaying an indication of the generated final report on a sixth area of the user interface different from the first to fifth areas, wherein at least the first, second, fourth, and sixth areas are disposed in a same display screen of the user interface such that information contained in the first, second, fourth, and sixth areas are simultaneously visible via the same display screen.

In some aspects, the techniques described herein relate to a method, wherein the third and the fifth areas are simultaneously visible via the same display screen as the first, second, fourth, and sixth areas.

In some aspects, the techniques described herein relate to a method, wherein at least two of the first to sixth areas are arranged horizontally, vertically, or diagonally in the same display screen.

In some aspects, the techniques described herein relate to a method, wherein at least two of the first to sixth areas have different sizes or shapes, wherein one or more of the first to sixth areas are dynamically resized to adapt to the user interface.

In some aspects, the techniques described herein relate to a method, wherein determining the one or more trends in the validated machine readable text further includes: determining, by the processor, one or more future trends in the validated machine readable text based on the comparison of the first set of validated machine readable text and the second set of validated machine readable text, wherein the one or more future trends include one or more predicted future misstatements and one or more predicted inconsistent responses.

In some aspects, the techniques described herein relate to a method, further including: storing the generated final report in a blockchain ledger on a blockchain network, wherein the blockchain ledger secures the generated final report in a decentralized ledger that cannot be altered; automatically verifying one or more aspects of the final report in the blockchain ledger using a smart contract on the blockchain network, wherein the smart contract is configured to verify a first aspect of the one or more aspects of the final report before verifying a second aspect;

In some aspects, the techniques described herein relate to a method, wherein the data that is commonly associated with fraud includes phrases such as unexplained payment, overstated revenue, and suspicious vendor names.

In some aspects, the techniques described herein relate to a method, wherein selecting the outlier data from the one or more inconsistencies above a threshold includes selecting a transaction that is 20% larger compared to a next highest transaction.

In some aspects, the techniques described herein relate to a method, further including: determining, based on a comparison of the third data set and the plurality of different sets of template data, a set of missing data, the set of missing data including current financial data of the first user in the plurality of different sets of template data and not in the third data set; establishing a third communication link with the user terminal of the first user; and receiving, by the second communication interface of the server, an updated third data set from the user terminal, the updated third data set including the current financial data of the first user in the plurality of different sets of template data and not in the third data set.

In some aspects, the techniques described herein relate to a method, wherein validating the machine readable text includes validating the machine readable text against general reporting standards including one or more of generally accepted accounting principles, International Financial Reporting Standards, and Sarbanes-Oxley Act.

In some aspects, the techniques described herein relate to a method, further including: in response to determining that the machine readable text does not contain at least one of the plurality of different sets of template data, receiving, by the second communication interface of the server, a fourth data set from the user terminal, the fourth data set including updated current financial data of the first user.

In some aspects, the techniques described herein relate to a method, wherein inconsistent data that is inconsistent with a set of predetermined rules includes one or more of data obtained from a suspicious vendor, duplicate data, or data received on a weekend.

In some aspects, the techniques described herein relate to a method, further including a machine learning model, the method further including: storing the determined one or more anomalies in a datastore associated with the machine learning model; and training the machine learning model based on the stored one or more anomalies.

In some aspects, the techniques described herein relate to a system on a server for displaying data sets on a user interface, the system including: one or more processors; and one or more non-transitory computer-readable media storing instructions which, when executed by the one or more processors, cause the one or more processors to: store, in a memory of the server, a final report template and a plurality of templates respectively including a plurality of different sets of template data, the plurality of different sets of template data including a first set of template data and a second set of template data different from the first set of template data; provide a first database storing a first data set including past financial data of a first user; establish a first communication link with a second database storing a second data set including public financial information of the first user; receive, by a first communication interface of the server, the second data set from the second database; establish a second communication link with a user terminal of the first user; receive, by a second communication interface of the server, a third data set from the user terminal, the third data set including current financial data of the first user; compare, by a processor of the server, the plurality of different sets of template data with the first data set, the second data set, and the third data set; select, by the processor, a plurality of subsets of data from each of the first data set, the second data set, and the third data set that are similar to at least one of the plurality of different sets of template data, the plurality of subsets of data having an image data format; convert, by the processor, the selected plurality of subsets of data having the image data format into machine readable text, the machine readable text including a first set of machine readable text associated with the first set of template data and a second set of machine readable text associated with the second set of template data; determine whether the machine readable text contains at least one of the plurality of different sets of template data; in response to determining that the machine readable text contains at least one of the plurality of different sets of template data, validate the machine readable text; select, by the processor, a first set of validated machine readable text from the validated machine readable text associated with the first set of template data and a second set of validated machine readable text from the validated machine readable text associated with the second set of template data; determine, by the processor, one or more trends in the validated machine readable text based on a comparison of the first set of validated machine readable text and the second set of validated machine readable text, wherein the one or more trends include: one or more changes over time between the first set of validated machine readable text and the second set of validated machine readable text, or one or more inconsistencies between the first set of validated machine readable text and the second set of validated machine readable text; determine, by the processor, one or more anomalies in the validated machine readable text, wherein determining the one or more anomalies includes: determine, by the processor, outlier data from the validated machine readable text, wherein the outlier data is selected from the one or more changes or one or more inconsistencies above a threshold, and determine, by the processor, inconsistent data from the validated machine readable text, wherein the inconsistent data is inconsistent with a set of predetermined rules; determine, by the processor, one or more fraud indicators in the validated machine readable text, the one or more fraud indicators containing data that is commonly associated with fraud or the determined one or more trends includes an unexplained change in the data; generate, by the processor, an anomaly alert for each of the determined one or more anomalies; generate, by the processor, a fraud alert for each of the determined one or more fraud indicators; display, by the processor, the anomaly alerts on a first area of the user interface; display, by the processor, the fraud alerts on a second area of the user interface, wherein the second area of the user interface is different than the first area; receive a first set of review data, by a third communication interface of the server, from an auditor computer; incorporate the first set of review data into a third area of the user interface different from the first and second areas; based on a final report template, automatically generate, by the processor, a final draft report by combining the first set of review data, the anomaly alerts, and the fraud alerts in the final report template; incorporate the final draft report into a fourth area of the user interface different from the first, second, and third areas; receive a second set of review data by the user interface from the auditor computer; modify the final draft report based on the second set of review data to generate final report; incorporate the second set of review data into a fifth area of the user interface different from the first to fourth areas; and display an indication of the generated final report on a sixth area of the user interface different from the first to sixth areas, wherein at least the first, second, fourth, and sixth areas are disposed in a same display screen of the user interface such that information contained in the first, second, fourth, and sixth areas are simultaneously visible via the same display screen.

In some aspects, the techniques described herein relate to a system, wherein the third and the fifth areas are simultaneously visible via the same display screen as the first, second, fourth, and sixth areas.

In some aspects, the techniques described herein relate to a system, wherein at least two of the first to sixth areas are arranged horizontally, vertically, or diagonally in the same display screen.

In some aspects, the techniques described herein relate to a system, wherein at least two of the first to sixth areas have different sizes or shapes, wherein one or more of the first to sixth areas are dynamically resized to adapt to the user interface.

In some aspects, the techniques described herein relate to a system, wherein to determine the one or more trends in the validated machine readable text, the one or more processors are further configured to: determine one or more future trends in the validated machine readable text based on the comparison of the first set of validated machine readable text and the second set of validated machine readable text, wherein the one or more future trends include one or more predicted future misstatements and one or more predicted inconsistent responses.

In some aspects, the techniques described herein relate to a system, wherein the one or more processors are further configured to: store the generated final report in a blockchain ledger on a blockchain network, wherein the blockchain ledger secures the generated final report in a decentralized ledger that cannot be altered; and automatically verify one or more aspects of the final report in the blockchain ledger using a smart contract on the blockchain network, wherein the smart contract is configured to verify a first aspect of the one or more aspects of the final report before verifying a second aspect.

In some aspects, the techniques described herein relate to a non-transitory computer readable recording medium for storing instructions, when executed by one or more processors, that cause the one or more processors to perform the method.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system. Furthermore, any aspect of a system can be configured to perform a method of another aspect.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

These and other features, aspects, and advantages of the present application are described with reference to drawings of certain embodiments, which are intended to illustrate, but not limit, the present disclosure. It is to be understood that the attached drawings are for the purpose of illustrating concepts disclosed in the present application and may not be to scale.

FIGS. 3A-3B illustrate an example conversion of a scanned image document to machine readable text.

FIGS. 4A-4G illustrate example alerts and alert displays on a user interface.

DETAILED DESCRIPTION

Figure 1:
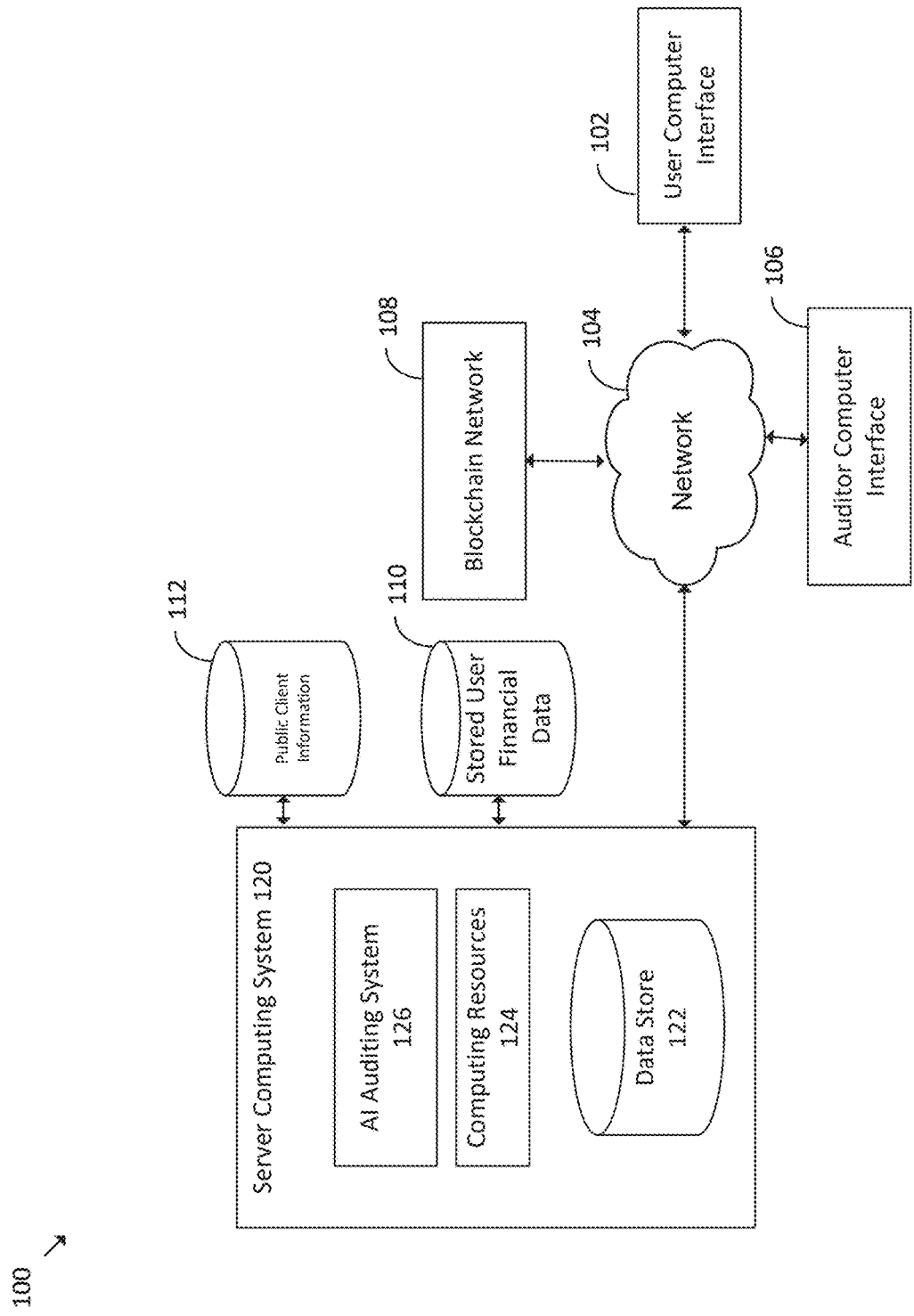
FIG. 1 illustrates an embodiment of a computing environment for implementing an AI based data processing system.

Disclosed herein are AI based systems and methods for processing different types of data and efficiently displaying processed data in different areas of a user interface to improve the functionality of the user interface.

The data can include a variety of types of data. For example, the data can be financial data. Financial audits verify the accuracy and reliability of an organization. Organizations as such will hire expert teams of auditor's to perform a yearly review of their financial statements. However, modern businesses are often highly complex and consist of an intricate network of sub-organizations that must be accounted for. As audits become more complex, human auditors can become more error prone, and auditing processes take more time, slowing down the efficiency, accuracy, and reliability of the system. With the introduction of modern AI and machine learning tools, huge improvements can be made to data processing and presentation.

Disclosed are methods and systems for the presentation of datasets for use in an AI based auditing system. The methods and systems disclosed can enable users to view all of the datasets required for some auditing processes.

By providing the auditor user with multiple datasets of potential financial transactions that require closer inspection, the auditor can make decisions with improved quality and efficiency that are otherwise challenging to make using traditional auditing practices. In some cases, the disclosed methods and systems include improvements over traditional auditing processes, such as predictive analytics and report generation. For example, the methods and systems can include automatic report generation and display when the auditing system determines one or more anomalies and/or one or more fraud indicators exist in the client user financial data. As another example, the methods and systems can automatically generate a final draft auditing report based on the generated alerts and auditor review data to efficiently draft an audit report without the possibility of human error.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Overview

Generally described, aspects of the present disclosure relate to the generation and presentation of graphical user interfaces (GUIs) for analyzing and presenting financial auditing data. For example, aspects of the present disclosure relate to the use of an AI based auditing system that can advantageously generate and display one or more anomaly and/or fraud alerts on an auditor computer interface. As will be described in more detail below, aspects of the present disclosure correspond to the use of modules within the AI based auditing system to transform input data into alert data that is presented on one or more GUIs.

Overview of Computing Environment

FIG. 1 illustrates an embodiment of a computing environment 100 for implementing an AI based data processing System 126. The computing environment 100 shown in FIG. 1 is merely an example system, and certain elements may be modified or removed, two or more elements combined into a single element, and/or other elements or equipment may be added. The computing environment 100 includes a server computing system 120, a public client information database 112, a stored user financial data database (or a past user financial data database) 110, a user computer interface 102, and an auditor computer interface 106.

The server computing system 120 may communicate data with the user computer interface 102 and the auditor computer interface 106 via, for example, at least one of a computer network 104 or a blockchain network 108. The network 104 can be wired or wireless. Although only one network 104 is illustrated, multiple distinct and/or distributed network 104 may be used. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet.

Figure 2:
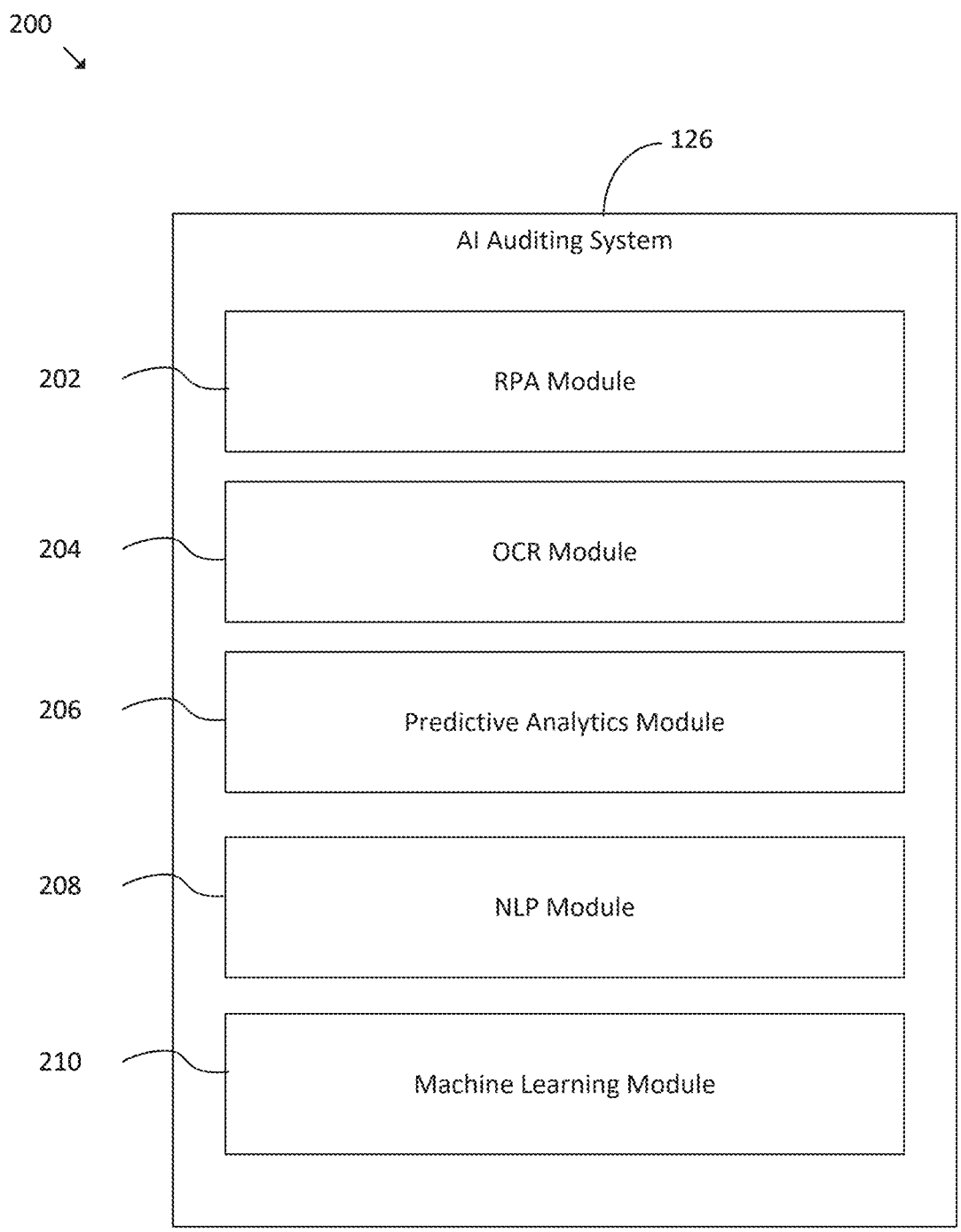
FIG. 2 illustrates an example block diagram depicting example functionality of the AI based data processing system.

FIG. 2 illustrates an example block diagram 200 depicting example functionality of the AI based data processing system 126. The AI based data processing System 126 can be used for various purposes including, but limited to, AI based auditing. For the purpose of convenience of description, embodiments will be described based on AI based auditing system, but the present disclosure is not limited thereto.

User Devices

FIG. 1 illustrates exemplary user computing interface 102 associated with one or more users (or one or more user computers) and the auditor computer interface 106 associated with an auditor (or an auditor computer). The user computer interface 102 can be a user terminal or part the user terminal (not shown). The auditor computer interface 106 can be an auditor terminal or part the auditor terminal (not shown). The user computing interface 102 and/or the auditor computer interface 106 may include hardware and software components for establishing communications over the network 104. For example, the user computing interface 102 and auditor computer interface 106 may be equipped with networking equipment and network software applications (for example, a web browser) that facilitate communications via one or more networks (for example, the Internet or an intranet). The user computing interface 102 and/or auditor computer interface 106 may have varied local computing resources such as central processing units (CPU) and architectures, memory, mass storage, graphics processing units (GPU), communication network availability and bandwidth, and so forth. Further, the user computing interface 102 and/or auditor computer interface 106 may include any type of computing system. For example, the user computing interface 102 and/or auditor computer interface 106 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the user computing interface 102 and/or auditor computer interface 106 are referred to generally as computing resources. The computing resources may include hardware, software, or a combination thereof. The computing resources may include one or more processing circuits and/or one or more processing modules.

The user computing interface 102 can communicate with the server computing system 120, via the network 104, to interact with AI Auditing System 126. For example, the user computing interface 102 can interact with the AI Auditing System 126 to enter input data, select data columns, receive user interface data, enter data filters, etc.

Similarly, the auditor computer interface 106 can communicate with the server computing system 120, via the network 104, to interact with AI Auditing System 126 to receive alert data, input review data, etc., Databases The past user financial data interface 110 and public financial information database 112 can be third-party databases and may include one or more internal and/or external data sources that can store data for use in the AI Auditing System 126. In some embodiments, one or more of the data repositories and/or the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas), a non-relational database, or a record-based database. The above listed databases are merely examples and other databases may also be used.

Server Computing System

The server computing system 120 may include a datastore 122, computing resources 124, and AI Auditing System 126. One or more of the elements 122-126 of the server computing system 120 can communicate data with the public client information database 112 and the past user financial data database 110. The configuration of the server computing system 120 shown in FIG. 1 is merely an example and other configuration is also possible. For example, one or more of the elements 122-126 of the server computing system 120 may be omitted, combined into others, or another element may be added to the server computing system 120. The computing resources 124 can include one or more computing devices, such as servers and databases for managing the various process described herein. The datastore 122 can include databases, local memory, cloud memory, and the like, for storing data sets, user account information, etc.

The server computing system 120 can include one or more application host systems, such as the AI Auditing System 126 and data source(s), such as the datastore 122. The server computing system 120 may include one or more computing systems configured to execute at least a portion of the AI Auditing System 126. In some embodiments, the one or more application host systems can include one or more computing devices, such as servers and databases that may host and/or execute a portion of one or more instances of the AI Auditing System 126. In certain embodiments, instead of or in addition to executing a portion of AI Auditing System 126, the application host systems may execute another application, which may complement and/or interact with the AI Auditing System 126 during execution of an instance of the AI Auditing System 126 by the user computing interface 102 and/or auditor computer interface 106.

The server computing system 120 may run on a variety of computing devices, such as a server, a Windows server, a Structure Query Language server, a Unix Server, a personal computer, a laptop computer, a smart phone, a personal digital assistant, a tablet, and so forth. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth. In other embodiments, the server computing system 120 may run on a cluster computer system, a mainframe computer system and/or other computing system suitable for controlling and/or communicating with large databases, performing high volume transaction processing, and generating reports from large databases. The computing system is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

Access to the AI Auditing System 126 by the user computing interface 102, auditor computer interface 106, and/or by data sources, such as datastore 122, may be through a web-enabled user access point. For example, the user computing interface 102 may have a browser module that is implemented as a module that uses text, graphics, audio, video, and/or other media to present data and to allow interaction with data via the network 104.

The server computing system 120 may include one or more internal and/or external data sources (for example, datastore 122). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas), a non-relational database, or a record-based database.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

Blockchain Network System

The blockchain network 108 provides the computing environment 100 the ability to store user financial data and audit records in a digital ledger. The blockchain network 108 can provide a secure, immutable, and transparent method of storage to store the information communication within the computing environment 100. The blockchain network 108 can create a chain of records that are timestamped and linked to the previously entered record. For example, after the audit is completed, the final audit report, financial transactions, and other audit findings can be stored consecutively in the blockchain network 108. In this example, once the data is stored in the blockchain network 108, it cannot be altered, creating a record that can be referenced in future reports (e.g., the following year's audit report).

The blockchain network 108 may also use smart contracts to automatically verify financial transactions and/or documents. Smart contracts are pre-defined, automatic actions that can be triggered by certain events. When the triggering event occurs, the smart contract can activate and perform a specific task. For example, a smart contract can be created to ensure that documents or transactions that are added to the blockchain network 108 comply with predefined rules. In this example, funds allocated to a specific project may be subject to certain predefined rules set by the project. A smart contract can be executed that automatically verifies whether the added fund is being used according to the predefined rules. If the funds are being used according to the predefined rules, the smart contract can automatically update the blockchain network 108 ledger and move to the next transaction. However, if the funds are not used according to the predefined rules, the smart contract can automatically flag the transaction for further auditor review.

AI Auditing System

The AI Auditing System 126 can provide the various services and processes described herein. For example, the AI Auditing System 126 can include various programs, applications, application programming interfaces (APIs), and the like for interfacing with user computing interface 102, the auditor computer interface 106, the blockchain network 108, the past user financial data interface 110 and public financial information database 112. The AI Auditing System 126 is described in more detail herein with respect to FIG. 2.

Example Block Diagram of AI Auditing System

In the FIG. 2 example, the AI Auditing System 126 includes the robotic process automation (RPA) module 202, the optical character recognition (OCR) module 204, the predictive analytics module 206, the natural language processing (NLP) module 208, and the machine learning module 210. At least one of the modules 202-210 can be implemented with a processor. The configuration or layout of the AI Auditing System 126 shown in FIG. 2 is merely an example, and other configurations are also possible. For example, one or more of the modules or elements of the AI Auditing System 126 may be omitted, combined with others, or another element may be added to the AI Auditing System 126.

The RPA module 202 may automatically request and handle data received from users. The RPA module 202 can automatically send document requests to users via web applications such as Suralink, Docusign, and/or other document sharing platforms. The RPA module 202 can monitor the documents as they are received to ensure that the information across documents aligns. The RPA module 202 can further track missing documents (e.g., requested documents that have not been received by the user) and automatically communicate with the user to send additional document requests for the missing documents.

In some cases, the RPA module 202 may further extract financial information from the received documents. The RPA module 202 can enter the extracted financial information into a plurality of templates. The plurality of templates can be stored in the datastore 122 and may include templates such as prior year financial data templates, current year financial data templates, final auditing report templates, etc. When the financial information is entered into the plurality of templates, the RPA module 202 may check the data to ensure alignment.

For example, the RPA module 202 may request and receive the general and payroll ledgers from the user. The RPA module 202 may then extract the financial information from the general and payroll ledgers and check that the information across the ledgers is aligned (e.g., is the same) and ensure there are no discrepancies. When the RPA module 202 ensures that the received financial information is aligned, the RPA module 202 can enter the information into a first template (e.g., for historic financial data) and a second template (e.g., for current financial data) for further comparison.

In a further example, the RPA module 202 may request the general and payroll ledgers from the user (via the user computing interface 102) and receive only the general ledger. In such examples, the RPA module 202 can automatically detect the missing ledger and send a second request to the user for the payroll ledger.

During the auditing process, the RPA module 202 may be further utilized to automatically retrieve sample financial data from the financial documents for testing. For example, the RPA module 202 may select high-risk transactions and/or randomly selected data from the plurality of templates and provide the selected data to the AI Auditing System 126 (e.g., the predictive analytics module 206 and/or the NLP module 208) for testing.

In further examples, the RPA module 202 can automatically generate documents using the plurality of predefined templates. The RPA module 202 may automatically generate the draft and final auditing reports (e.g., after testing), engagement letters (e.g., before testing), management letters, and/or any other report used. For example, upon completion of the auditing process, the RPA module 202 can automatically generate the draft audit report based on a third template from the plurality of templates and communicate the draft audit report to the auditor computer interface 106.

The OCR Module 204 can convert the received financial documents (e.g., via the RPA module 202) into machine readable text. The OCR Module 204 can take documents in various formats (e.g., scanned image documents, etc.) and convert them into machine readable text formats that are interactable with the AI Auditing System 126. The OCR Module 204 may also extract key details from the converted machine readable text. For example, the AI Auditing System 126 may receive a client's invoice as a scanned image. The OCR Module 204 can convert the scanned image of the client's invoice into machine readable text and extract the key data from the invoice such as the vendor's name, the payment amount, the due date, etc.

In some cases, after converting the financial documents into machine readable text, the OCR Module 204 may validate the machine readable text by reviewing for any missing information (e.g., based on the predefined templates). For example, the OCR Module 204 may review the machine readable text to validate that the documents comply with predetermined rules (e.g., as described herein) and/or general reporting standards including, but not limited to, GAAP (generally accepted accounting principles), IFRS (International Financial Reporting Standards), SOX (Sarbanes-Oxley Act).

In further cases, the OCR Module 204 may review the machine readable text received and converted from a first scanned image document with machine readable text received and converted from a second scanned image document to check for inconsistencies. For example, the OCR Module 204 may compare entries in a converted bank statement with entries in a converted general ledger document to verify the data matches.

The predictive analytics module 206 may analyze the financial data to identify one or more trends. The predictive analytics module 206 may utilize the first template data (e.g., the historic financial data) and the second template data (e.g., the current year financial data) to identify trends and/or high-risk areas in the machine readable text of the user financial data. For example, the predictive analytics module 206 may analyze the historic payroll data obtained from the historic financial data to identify a trend of increasing payroll. Based on the identification of this trend, the AI Auditing System 126 can generate an alert to display to the auditor computer interface 106 for the auditor to further review for payroll discrepancies.

As another example, the predictive analytics module 206 may compare the historic financial data and the current year financial data and identify an inconsistency between the disbursements financial data. In such examples, the predictive analytics module 206 can generate an alert to display to the auditor computer interface 106 for the auditor to further review the disbursement area.

The NLP module 208 can analyze the machine readable text (e.g., generated by the OCR Module 204 as described herein) to identify one or more indicators of fraud and/or one or more anomalies in the data. The NLP module 208 can receive the one or more identified trends from the predictive analytics module 206 and determine an outlier based on the one or more trends. For example, the NLP module 208 may receive a trend from the predictive analytics module 206 indicating that there is an inconsistency in the received disbursement data. The NLP module 208 can further analyze the disbursement data to determine an outlier in the spending patterns for the user. The NLP module 208 may then generate an anomaly alert to display to the auditor computer interface 106 to indicate to the auditor that the disbursement data requires further review.

For example, the NLP module 208 can scan the financial data to identify terms that are common indicators of fraud and/or misstatements (e.g., "unexplained payment," "overstated revenue," "suspicious vendor names" etc.). The NLP module 208 can detect these terms and generate a fraud alert to display to the auditor computer interface 106 for further review.

In some cases, the NLP module 208 may detect entries in the financial data that are inconsistent with predetermined rules. Predetermined rules can be pre-defined and/or dynamically adjusted rules used in the auditing process to detect inconsistencies. Predetermined rules may be established based on regulatory requirements (e.g., GAAP, SOX, etc.), client specific auditing policies (e.g., no transactions may occur on weekends), and commonly used rules (e.g., checking for duplicate transactions).

For example, the financial data may contain an Assistance Living Numbers entry. However, the entry does not appear as required (e.g., by a predetermined regulatory requirement) in the Schedule of Expenditures of Federal Awards file. The NLP module 208 can detect this inconsistency and generate an anomaly alert for display on the auditor computer interface 106.

In some cases, the NLP module 208 may identify patterns of fraudulent transactions. When the NLP module 208 detects a common indicator of fraud and/or outlier, the NLP module 208 can store the action for future reference. In this example, the NLP module 208 can compare current financial transactions with previously stored fraudulent transactions to improve detection of fraudulent behavior. By storing fraudulent transactions and improving detection, the NLP module 208 can detect emerging patterns and inconsistencies in addition to detecting current fraudulent actions.

The machine learning module 210 may comprise a machine learning model capable of using past user financial data to predict results of future audits. The machine learning module 210 can utilize the historic financial data, current year financial transactions, and the patterns identified by the NLP module 208 to predict potential anomalies and/or fraudulent transactions. For example, based on historic financial data and user financial records indicating that there were large fluctuations in payroll the previous year, the machine learning module 210 may predict that payroll anomalies may be more likely this year, and may generate an anomaly alert to display to the auditor computer interface 106.

The machine learning module 210 may also include the ability to store (e.g., in the datastore 122) the data and the results from previous predictions. The machine learning module 210 can learn from the previous results to improve its prediction accuracy and improve its identification of trends, patterns, and anomalies in future financial auditing reports. For example, if an anomaly was not identified in the current year payroll data, the machine learning module 210 can store the historic financial data and user financial records indicating that there were large fluctuations in payroll the previous year and the result that no anomaly was identified in the current year payroll in datastore 122. The machine learning module 210 may access the stored data in future audit reports to train the machine learning model to learn that large fluctuations in payroll are not as likely to indicate payroll anomalies as previously expected.

In some cases, the machine learning module 210 may also automatically select auditing samples, automatically set custom materiality thresholds (e.g., thresholds for whether a datapoint is considered an anomaly), and automatically set focus areas.

Example Machine Readable Text

FIGS. 3A-3B illustrate an example scanned image document of an itemization of uncleared checks and payments 300 that may be converted into a machine readable text itemization of the same uncleared checks and payments 350 (e.g., by the OCR Module 204). While the scanned image document illustrated in FIG. 3A is of an example uncleared checks and payments itemization, it should be understood that different types and examples of scanned image documents may be converted into machine readable text by the OCR Module 204. For example, the scanned image document may be an invoice, a bank statement, or any other example financial document.

The scanned image document of an itemization of uncleared checks and payments 300 may include a scanned title 302A, a scanned payment date list 304A, a scanned payment type list 306A, a scanned reference number list 308A, a scanned list of payees 310A, and a scanned payment amount list 312A. The scanned image document of an itemization of uncleared checks and payments 300 may be in a format used by a specific client and uploaded in its standard form by the client to the AI Auditing System 126 (as described herein with reference to FIG. 2). However, converting the scanned image into machine readable text may improve efficiency and accuracy of the AI Auditing System 126. As described herein, the OCR Module 204 may identify and extract the data from the scanned image document of an itemization of uncleared checks and payments 300. For example, the OCR Module 204 may extract the titles and the data listed under the titles for each of the scanned title 302A, the scanned payment date list 304A, the scanned payment type list 306A, the scanned reference number list 308A, the scanned list of payees 310A, and the scanned payment amount list 312A. The OCR Module 204 may then create the machine readable text itemization of the same uncleared checks and payments 350 as illustrated in FIG. 3B.

The machine readable text itemization of the same uncleared checks and payments 350 may include the same information as the scanned image document of an itemization of uncleared checks and payments 300. For example, the machine readable title 302B may be the same as the scanned title 302A, the machine readable payment date list 304B may be the same as the scanned payment date list 304A, the machine readable payment type list 306B may be the same as the scanned payment type list 306A, the machine readable reference number list 308B may be the same as the scanned reference number list 308A, the machine readable list of payees 310B may be the same as scanned list of payees 310A, and the machine readable payment amount list 312B scanned payment amount list 312A.

Example Displayed Alerts

Figures 4A, 4B:
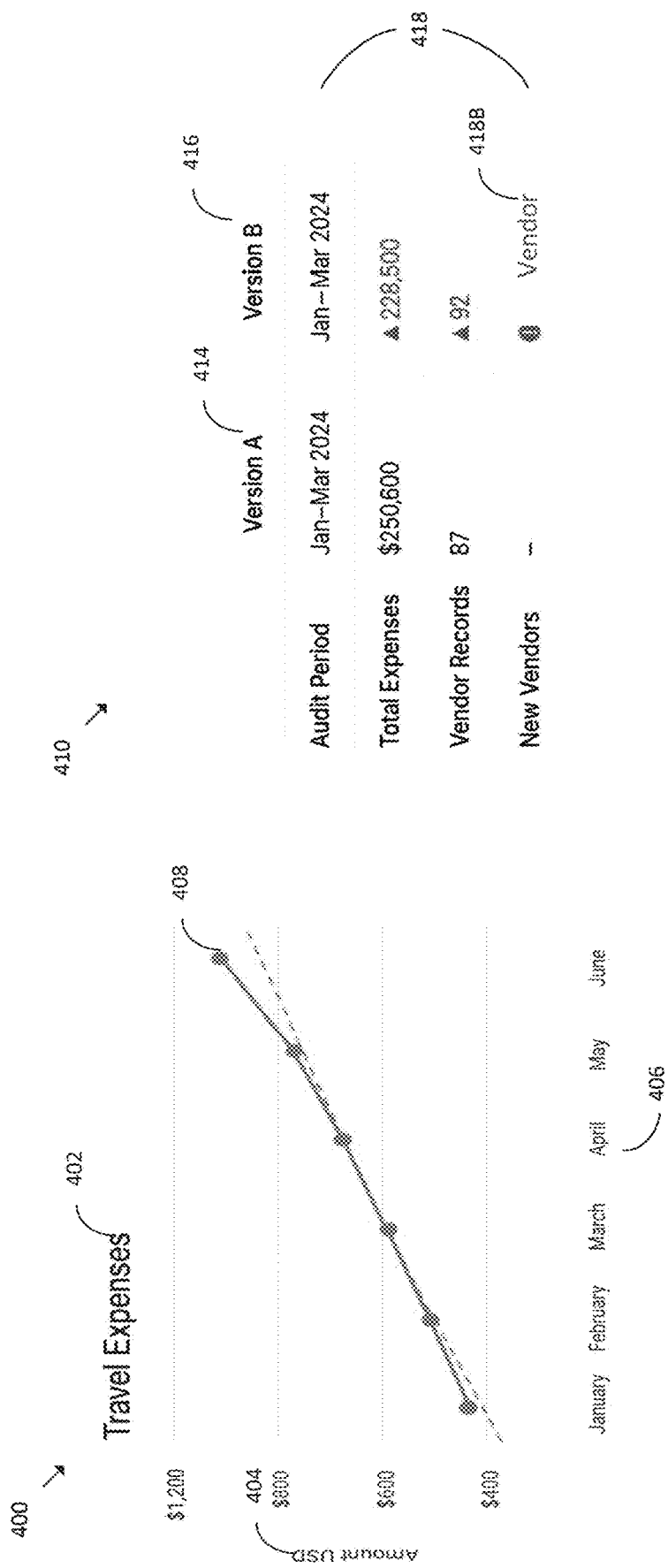
Figure 4D:
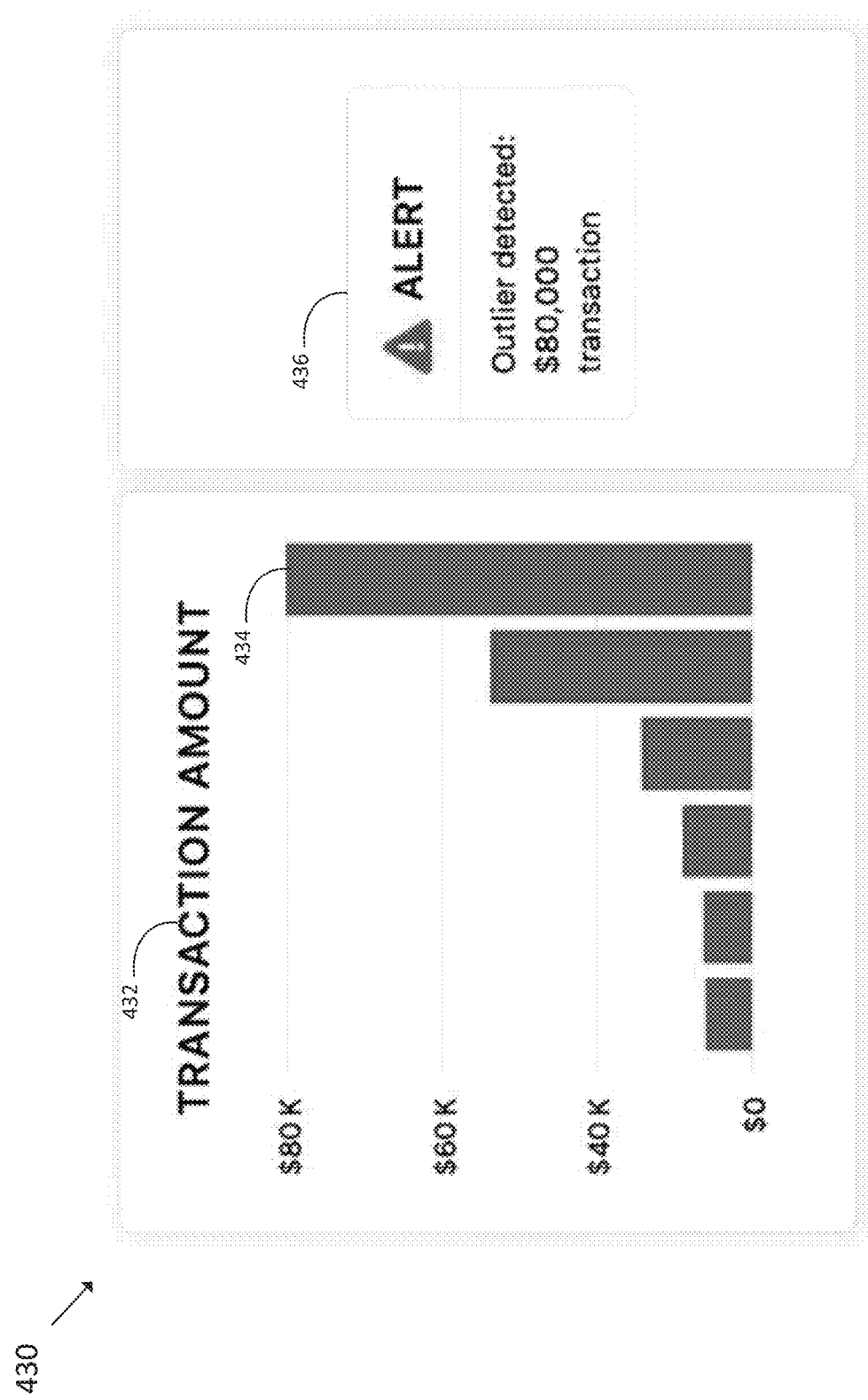
Figure 4E:
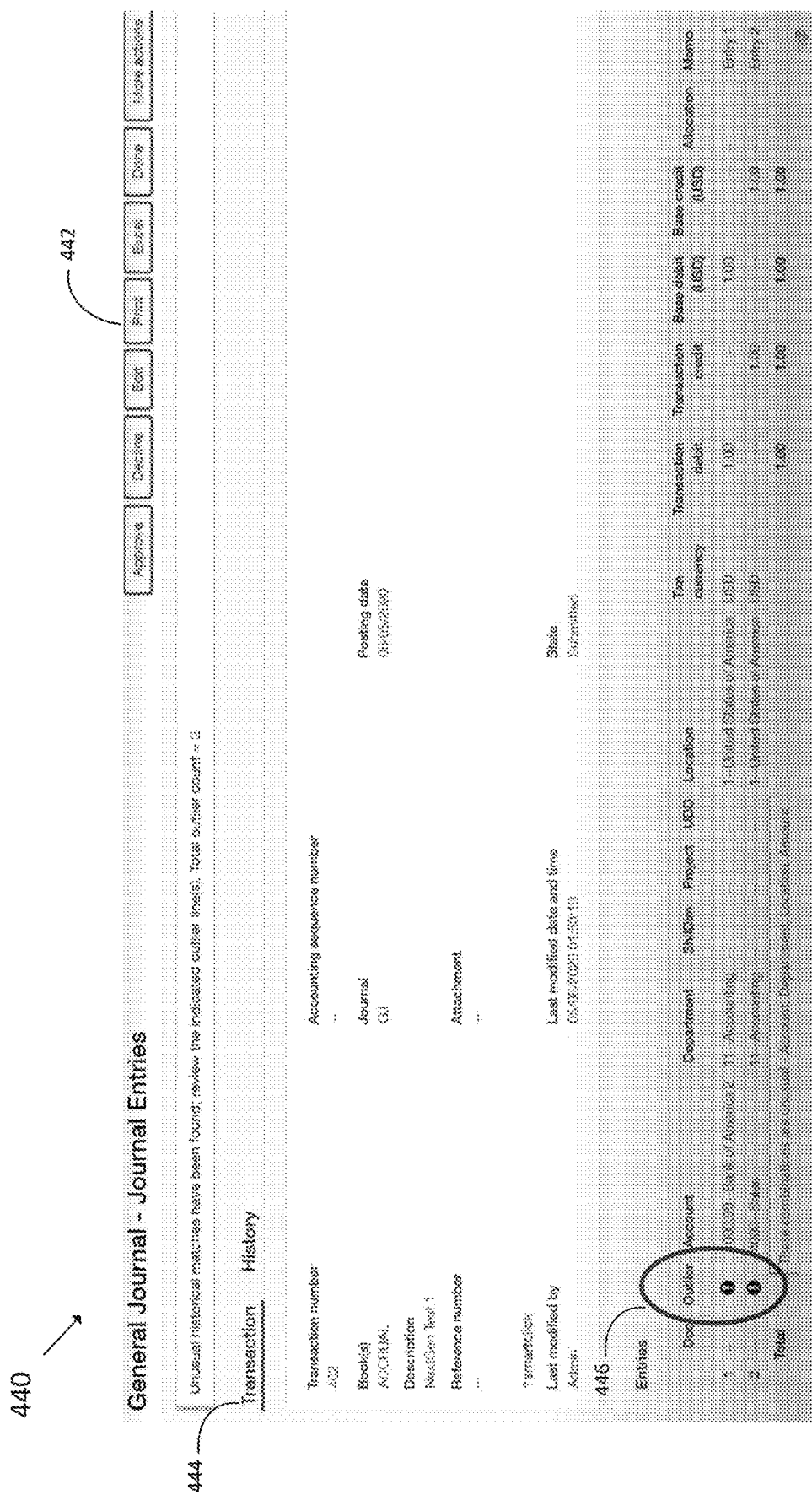
Figure 4F:
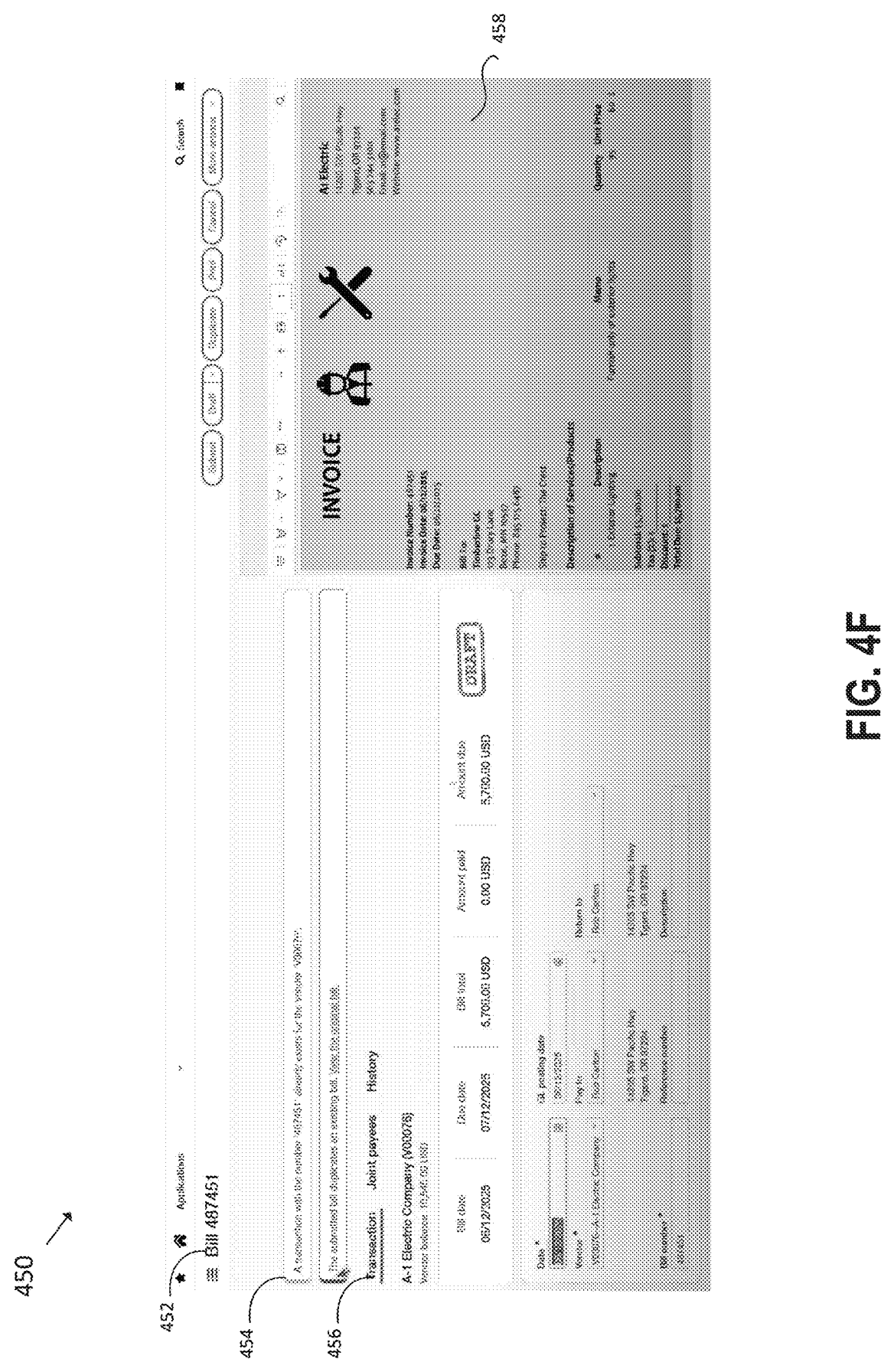

FIGS. 4A-4G illustrate example displayed alerts that are generated by the AI Auditing System 126. In some cases, the displayed alerts depicted in FIGS. 4A-4G may be displayed on graphical user interfaces described herein (e.g., user computing interface 102 and/or auditor computer interface 106). FIG. 4A illustrates displayed trend 400, FIG. 4B illustrates displayed change 410, FIG. 4C illustrates displayed inconsistency 420, FIGS. 4D-4E illustrate displayed outlier 430 and displayed outlier alert screen 440, FIG. 4F illustrates displayed data inconsistent with predetermined rules 450, and FIG. 4G illustrates displayed fraud indicators 460.

The displayed trend 400 illustrated in FIG. 4A may be generated by the predictive analytics module 206 as described herein. As in the example FIG. 4A, the displayed trend 400 may be generated when the predictive analytics module 206 identifies a change over time between a first set of machine readable text (e.g., travel expenses for a particular month in a prior year) and a second set of machine readable text (e.g., travel expenses for that same particular month in the current year).

As illustrated in FIG. 4A, the displayed trend 400 may be generated in the form of a graph, including a title 402, a transaction amount 404 indicating the delta change in the amount (e.g., USD) expensed on travel, a month of the transaction 406 indicating the particular month the travel expenses were incurred, and a line graph 408 indicating the change. However, the displayed trend 400 may be generated in a form other than a line graph, such as another form of graphical representation, written explanation, etc.

The displayed trend 400 may be generated by the AI Auditing System 126 (via the predictive analytics module 206) in response to the predictive analytics module 206 determining that there is a trend of a consistent increase in travel expenses throughout the current year as compared to the previous year. The AI Auditing System 126 may identify this trend (via the NLP module 208 and/or the machine learning module 210) as an anomaly and generate the displayed trend 400 as an alert to display on the auditor computer interface 106.

The displayed change 410 illustrated in FIG. 4B may be generated by the predictive analytics module 206 as described herein. As in the example FIG. 4B, the displayed change 410 may be generated when the predictive analytics module 206 identifies one or more changes between the first set of machine readable text (e.g., data received from the general ledger) and the second set of machine readable text (e.g., data obtained from an invoice ledger).

As illustrated in FIG. 4B, the displayed change 410 may be generated in the form of a table, including version A 414 and version B 416 indicating the first set of machine readable text (e.g., "Version A") compared to the second set of machine readable text (e.g., "Version B"), the plurality of changes identified 418 indicating the data identified to be different based on a comparison of Version A 414 and Version B 416, and an identified change 418B indicating a change that may require an alert to be communicated to the auditor computer interface 106.

The displayed change 410 may be generated by the AI Auditing System 126 (e.g., via the predictive analytics module 206) in response to the AI Auditing System 126 generating a comparison between version A 414 and version B 416. The AI Auditing System 126 may identify some of the changes as positive (e.g., not requiring an alert to be communicated to the auditor computer interface 106) and represented in green text. The AI Auditing System 126 may alternatively identify a change as negative. The AI Auditing System 126 may represent the negative change in red text along with an alert symbol. For example, version A 414 may not indicate that a new vendor was included in the current year audit report. However, version B 416 may indicate that a new vendor (herein "Vendor") was included. The AI Auditing System 126 may identify this change as an error (e.g., an inconsistency, an indication of fraud, etc.) and may generate an alert to display on the auditor computer interface 106.

The displayed inconsistency 420 illustrated in FIG. 4C may be similar to the displayed change 410 as illustrated in FIG. 4B, however the displayed inconsistency 420 may generate an alert for an identified monetary change 428B between a budgeted amount 424 (e.g., a first set of machine readable text similar to version A 414) and a general ledger (GL) amount 426 (e.g., a second set of machine readable text similar to version B 416). In the example FIG. 4D, the travel amount budgeted under budgeted amount 424 is inconsistent with the travel amount recorded in the general ledger general ledger amount 426. This inconsistency can be flagged by the AI Auditing System 126 (e.g., via the predictive analytics module 206) and the displayed inconsistency 420 can be generated and communicated to the auditor computer interface 106.

The displayed outlier 430 illustrated in FIG. 4D illustrates an example outlier identified by the AI Auditing System 126. The displayed outlier may be for a transaction amount greater than other transactions by at least a threshold amount (e.g., 20% larger). For example, as illustrated in transaction graph 432, a transaction 434 of $80,000 was detected in the received financial data of the user. In some cases, the transaction 434 may be identified as an outlier because it was greater than the previous transaction by at least $20,000 (e.g., a threshold amount). In other cases, the transaction 434 may have been identified as an outlier because the set of predetermined rules may classify any transaction greater than or equal to $80,000 as an outlier transaction. The type of threshold value is not limiting.

In the illustrated example displayed outlier 430, the AI Auditing System 126 (e.g., via the predictive analytics module 206 and/or the NLP module 208) can identify the outlier transaction 434 and generate the anomaly alert 436. The anomaly alert 436 may then be communicated to the auditor computer interface 106 via the network 104.

The outlier alert screen 440 illustrated in FIG. 4E illustrates an example auditor computer interface 106. The example auditor computer interface 106 may include a plurality of anomaly alerts, such as the anomaly alert 436 identified in FIG. 4D. The outlier alert screen 440 may additionally include transaction control selections 442, outlier warning particular transaction details 444, and outlier alerts 446. The transaction control selections 442 may allow the auditor to approve, decline, edit, print, add to an excel sheet, or take further actions with regard to each particular transaction that was communicated to it via the AI Auditing System 126. For example, the anomaly alert 436 generated and communicated in FIG. 4D may be displayed on the auditor computer interface 106. The auditor may review the transaction 434 and determine that the transaction 434 was not fraudulent and approve it.

The particular transaction details 444 may be displayed on the auditor computer interface 106 for each anomaly communicated to the auditor computer interface 106. For example, transaction number "402" (see, e.g., FIG. 4A) is displayed as the particular transaction details 444. The particular transaction details 444 provide the auditor the ability to review specific details about the transaction to determine if the anomaly was fraudulent.

The outlier alerts 446 may include one or more anomaly and/or fraud alerts that were communicated to the auditor computer interface 106 by the AI Auditing System 126. The one or more anomaly and/or fraud alerts may also include an outlier alerts 446 further indicating that the transaction requires closer review by the auditor.

The displayed data inconsistent with predetermined rules 450 illustrated in FIG. 4F illustrates an example auditor computer interface 106 for anomaly alerts generated for data that is inconsistent with predetermined rules, as described herein with reference to FIG. 2. The displayed data inconsistent with predetermined rules 450 includes a transaction 452, an alert description 454, transaction details 456, and transaction example 458. The alert description 454 may be one or more descriptions detailing the predetermined rule that the transaction 452 violated that caused the AI Auditing System 126 to generate and communicate the alert to the auditor computer interface 106. In the example FIG. 4F, the AI Auditing System 126 had already processed a transaction with the same transaction number as alert description 454, violating a predetermined rule against such duplicate transactions.

Transaction details 456 provides the auditor with further information regarding the transaction 452. For example, the transaction details 456 may include details pulled from the transaction example 458 such as the date of the transaction, the amount of the transaction, etc. The transaction details 456 may also include information such as "Draft" which may indicate to the auditor that transaction 452 is a draft transaction of the transaction that was already processed (and thus an explanation as to why the duplicate was created).

The displayed fraud indicators 460 illustrated in FIG. 4G illustrates an example list of alerts displayed on the auditor computer interface 106. For example, the displayed fraud indicators 460 may include a plurality of weekend transactions 462 (e.g., transactions that violate a predetermined rule against being executed on the weekend), a plurality of multiple small vendor transactions 464 (e.g., transactions that require further review because the vendor is below a threshold size), a plurality of unusual invoice patterns 466 (e.g., as identified by the NLP module 208 as described herein with reference to FIG. 2), and a plurality of duplicate payments 468 (as described herein with reference to FIG. 4F). Each of the plurality of alerts 462-468 may have been identified by the AI Auditing System 126 as violating a predetermined rule (e.g., as described herein with reference to FIG. 2.).

Each alert included in the plurality of alerts 462-468 may have been individually identified by the AI Auditing System 126 and communicated to the auditor computer interface 106 for review. The displayed fraud indicators 460 then provides the auditor to select one of 462-468 to review the specific type of alert.

Figure 5:
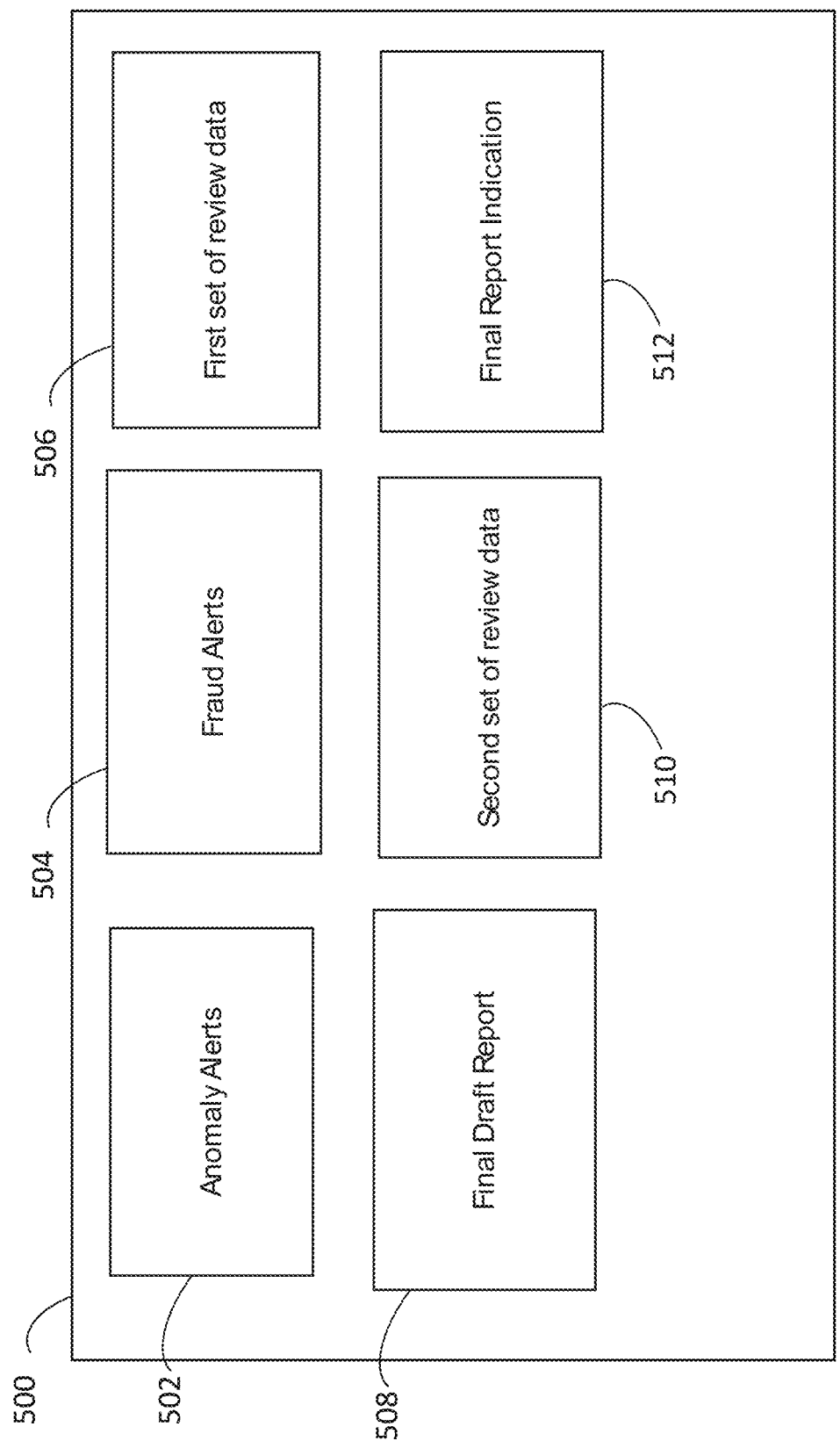
FIG. 5 illustrates an example configuration of a user interface.

As illustrated in FIG. 5, an example configuration of a user interface 500 is shown. The user interface 500 may be the user computer interface 102 or the auditor computer interface 106 shown in FIG. 1. The server computing system 120 can control or cause the user interface 500 to display various data sets including, but not limited to, those shown in FIG. 5. The user interface 500 may display one or more of a first area 502 including anomaly alert, a second area 504 including fraud alerts, a third area 506 including a first set of review data, a fourth area 508 including a final draft report, a fifth area 510 including a second set of review data, and a sixth area 512 including a final report indication. Any one or more of the first areas to sixth areas 502-512 may be displayed on the user interface 500 at one time. For example, The user interface 500 may first display the first area 502 including the anomaly alerts and then display the second area 504 including the fraud alerts, and not the third display area 506 including the first set of review data. Once the AI Auditing System 126 receives the first set of review data (as described herein with reference to FIG. 6), the AI Auditing System 126 may communicate and display an alert that the first set of review data was accounted for via the first set of review data to be displayed in the third area 506.

As described herein with reference to FIG. 5, at least one of the first to sixth display areas 502-512 can be displayed or provided in the user interface 500 such that the anomaly alerts, the fraud alerts, the first set of review data, the final draft report, the second set of review data, and/or the final report indication can be visible simultaneously via the same user interface 500. For example, at least two of the first to sixth areas 502-512 can be displayed on and visible via the same user interface 500. In some embodiments, at least two of the first to sixth areas 502-512 can be different in locations from each other. In these embodiments, at least two of the first to sixth areas 502-512 may not overlap each other, or may only partially overlap each other, so as to show sufficient information in the first to sixth areas 502-512.

As a non-limiting example, all of the first to sixth areas 502-512 may be visible on the user interface 500 as shown in FIG. 5. However, FIG. 5 is merely illustrative and should not be limiting. The display areas 502-512 may be arranged in any order in the user interface 500. For example, the first area 502 may be located in the upper left corner of the user interface 500 as illustrated in FIG. 5. Alternatively, the first display area 502 may be located in the upper right corner of the user interface 500, and the third area 506 may instead be located in the upper left corner of the user interface 500. At least two of the display areas 502-512 may be arranged horizontally, vertically, and/or diagonally in the same user interface 500.

Additionally or alternatively, the display areas 502-512 may have the same shape and/or size as illustrated in a non-limiting example of FIG. 5. However, the display areas 502-512 may alternatively be different sizes (e.g., the first area 502 may be larger than any of the second to sixth areas 504-512 and/or different shapes (e.g., the first area 502 may be a square and the sixth area 512 may be a circle, etc.). Additionally, or alternatively, the display areas 502-512 may be capable of dynamically resizing and/or adapting to avoid overlap and to dynamically adjust to different user interfaces. The AI Auditing System 126 may improve the efficiency of the server computing system 120 by automatically configuring or selecting the display areas 502-512 at one time and specific locations, and/or automatically configuring one or more of the display areas 502-512 in specific shapes and/or sizes, for example, based on the amount and/or type of information included in each of the display areas 502-512. The AI Auditing System 126 may not need send multiple data sets to the user interface 500 or may not cause the user interface 500 to display in two or more screens or pages. For example, by considering the amount and/or type of information included in each of the display areas 502-512, optionally adjusting at least one of shapes, sizes, or arrangements of the areas 502-512, and displaying at least two of the areas 502-512 to be visible on the same user interface 500 at one time (or simultaneously), the AI Auditing System 126 can reduce the amount of computational resources used by the server computing system 120 and improve the efficiency of the server computing system 120. Similarly, this can also reduce the computational resource and/or save power in the user interface 500.

Example Processes

FIGS. 6-11 are process flow diagrams of methods for generating alerts for display on an auditor computer interface 106, according to some embodiments. In some cases, the process flow diagrams of FIGS. 6-11 may be performed by the server computing system 120. In some cases, the process flow diagrams of FIGS. 6-11 may be performed by another computing device separate from and/or in data communication with the server computing system 120. For the purpose of convenience, the embodiments of FIGS. 6-11 will be described based on the server computing system 120 performing the process flow diagrams of FIGS. 6-11. Although the process flow diagrams of FIGS. 6-11 are described herein with reference to a particular order, in various embodiments, states herein may be performed in a different order, or omitted, and additional states may be added.

Figure 6:
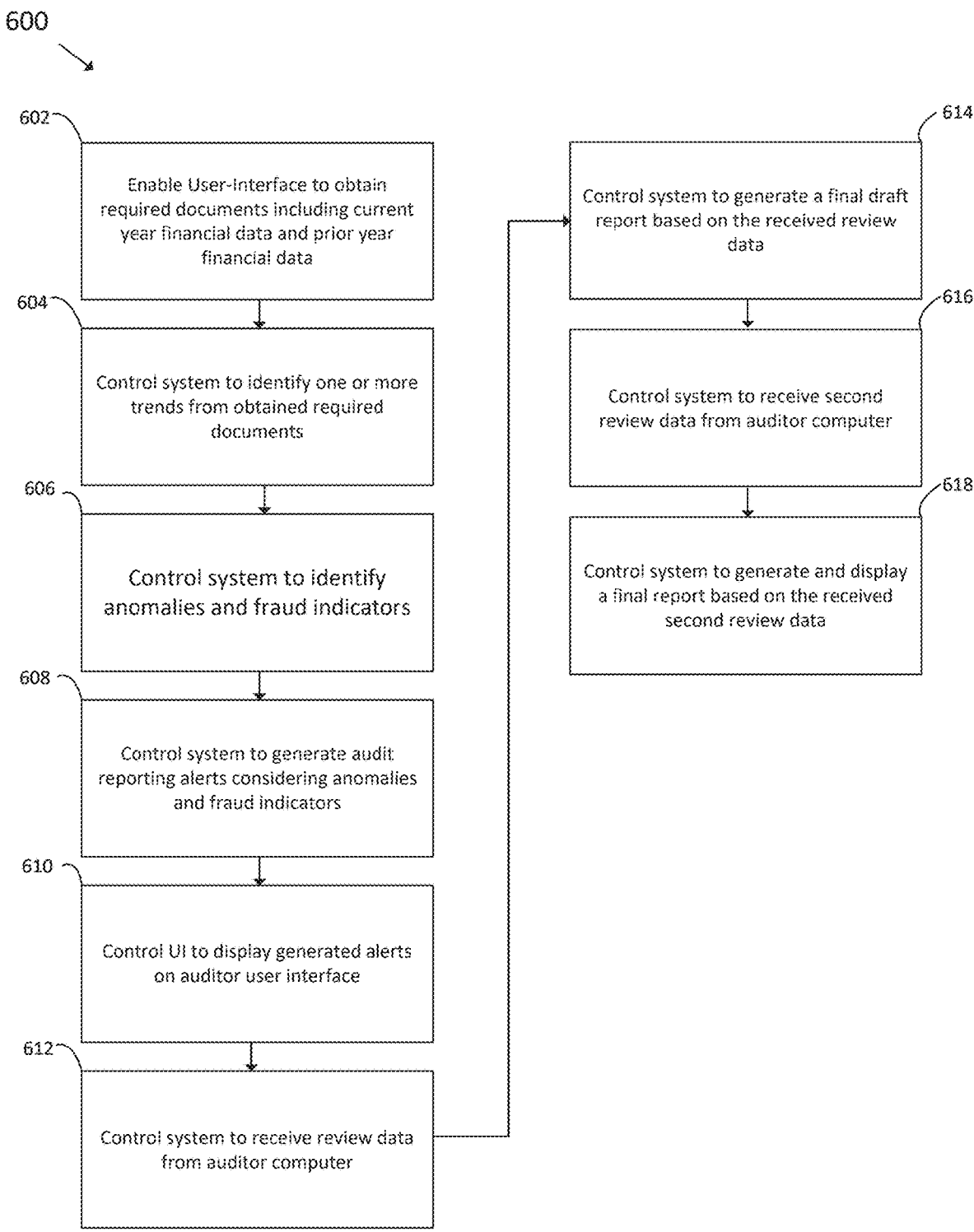
FIGS. 6-11 illustrate example process flow diagrams of various functionality and processes that can be performed by the AI based data processing system

Referring to FIG. 6, process flow diagram 600 illustrates a method for generating and displaying a final auditing report on a user computing interface 102. In some embodiments, process flow diagram 600 may be performed by the server computing system 120. For example, process flow diagram 600 may correspond to the server computing system 120, as described herein with reference to FIG. 2.

At block 602 a server computer system, such as the server computing system 120, can enable a user interface of the server computing system 120 (e.g., as part of the computing resources 124) to obtain financial documents included in the auditing process. For example, the server computing system 120 may obtain prior year financial data (e.g., from the past user financial data interface 110), publicly available current year financial data (e.g., form the public financial information database 112), and/or user submitted current year financial data (e.g., from the user computing interface 102).

In some cases, the server computing system 120 may obtain the financial documents via the RPA module 202, as described herein. For example, the RPA module 202 may automatically request data from the user, verify that the obtained data complies with regulatory standards, and send a second request to the user if the data does not comply.

In some cases, the server computing system 120 can compare the obtained financial data (e.g., the prior year financial data, publicly available current year financial data, and the user submitted current year financial data) with a plurality of different sets of template data to verify that all financial data required by regulatory standards was obtained. For example, regulatory standards may require current year payroll to be submitted for each year's audit. The server computing system 120 may compare the user submitted current year financial data with a first set of template data which includes current year payroll to determine if the financial data is missing.

Additionally or alternatively, in some cases, the server computing system 120 may further select a subset of financial data from each of the obtained financial data sources based on the financial data required in the sets of template data (e.g. and required during an auditing procedure). For example, the user submitted financial data may comprise payroll financial data (e.g., used in an auditing procedure), and personal finance data (e.g., not used in the company audit). The server computing system 120 may select a subset of the user submitted financial data that includes the payroll financial data and does not include the personal finance data.

In further cases, the server computing system 120 may, via the OCR Module 204, convert the financial data (or subset of financial data) having an image data format into machine readable text. For example, a user submitted invoice may be submitted in the form of a scanned image. In this example, the server computing system 120 can convert the scanned image into machine readable text, and extract the financial data commonly used in an audit (e.g., the financial data that aligns with the template data). In some cases, the server computing system 120 may extract the data into a first set of machine readable text that aligns with a first set of template data (e.g., extract prior year financial data that aligns with a template for prior year financial data) and a second set of machine readable text that aligns with a second set of template data (e.g., current year financial data that aligns with a template for current year financial data). The server computing system 120 may then verify that the extracted machine readable text contains the necessary financial data indicated by the template data, validate the machine readable text, and select a first set of validated machine readable text (e.g., prior year financial data) and second set of validated machine readable text (e.g., current year financial data) as samples for the audit testing.

At block 604, the server computing system 120 can control the AI Auditing System 126 to identify one or more trends from the obtained financial documents. For example, the server computing system 120 may compare previous year financial data for travel expenses (e.g., the first set of validated machine readable text) to current year financial data for travel expenses (e.g., the second set of validated machine readable text) to determine a trend of an increase in travel expenses over time, as described in more detail herein with respect to FIG. 4A.

In some cases, the one or more trends may indicate one or more inconsistencies between the first set of validated machine readable text and the second set of machine readable text. For example, the server computing system 120 may determine a vendor listed in the second set of validated machine readable text that was not listed in the first set of validated machine readable text.

At block 606, the server computing system 120 can control the AI Auditing System 126 to determine anomalies in the financial data. For example, the server computing system 120 can determine anomalies in the form of outlier data in the first and second set of validated machine readable text based on the determined one or more changes and/or the one or more consistencies. For example, the server computing system 120 may set a threshold of a $20,000 difference between transactions as an anomaly. In this example, if a transaction is greater than $20,000 compared to the next highest transaction, the server computing system 120 can determine this outlier transaction to be an anomaly.

Additionally or alternatively, the server computing system 120 can determine anomalies in the form of inconsistent data in the validated machine readable text, wherein the inconsistent data is inconsistent with a set of predetermined rules. For example, a predetermined rule may be customizable (e.g., from the client) rules that financial transactions must follow, and/or predefined rules set by regulatory authorities. In this example, a predetermined rule may be that transactions may not occur on weekends. If the server computing system 120 detects a transaction that was processed on a weekend, the server computing system 120 can determine the transaction to be an anomaly.

In some cases, the server computing system 120 can control the AI Auditing System 126 to determine one or more fraud indicators in the validated machine readable text. For example, the one or more fraud indicators may contain data that is commonly associated with fraud. The server computing system 120, via the NLP module 208, may detect key terms (e.g., "unexplained payment," "overstated revenue" etc.) that are common indicators of fraud. The server computing system 120 may determine fraud indicators based on the validated machine readable text containing these key terms.

Additionally, the server computing system 120 may determine one or more fraud indicators based on the determined one or more trends including an unexplained change in the data. For example, if the general ledger financial data contained in the validated machine readable text does not equate to the payroll financial data contained in the validated machine readable text, the server computing system 120 can determine a fraud indicator to indicate that there is an unexplained difference between the financial data sources.

At block 608, the server computing system 120 can control the AI Auditing System 126 to generate audit reports considering the determined one or more anomalies and determined one or more fraud indicators. For example, the server computing system 120 can generate an anomaly alert for each of the determined one or more anomalies, and a fraud alert for each of the determined one or more fraud indicators.

At block 610, the server computing system 120 can display the generated alerts on the auditor computer interface 106. For example, the server computing system 120 can display the anomaly alerts on a first area of the auditor computer interface 106 (e.g., displayed anomaly alert 502 as described herein with reference to FIG. 5), and the fraud alerts of a second area of the auditor computer interface 106 (e.g., displayed fraud alert 504 as described herein with reference to FIG. 5). In some cases, the first area and the second area of the auditor computer interface 106 may be the same, different, overlapping, etc.

At block 612, the server computing system 120 can enable a user interface of the server computing system 120 (e.g., as part of the computing resources 124) to obtain a first set of review data from the auditor computer. The first set of review data may comprise auditor responses to the generated anomaly alerts and fraud alerts. For example, the server computing system 120 may communicate a fraud alert to the auditor computer interface 106 based on a key term "unexplained payment." The auditor may review this key term and determine that there is no fraud based on the key term. The server computing system 120 may receive this determination in the first set of review data.

In some cases, the server computing system 120 can incorporate the first set of review data into its generated and displayed reports. For example, if the first set of review data indicates that one of the displayed fraud alerts is not an instance of fraud, the server computing system 120 may remove that generated fraud alert from the auditor computer interface 106, and display an indication of that removal on a third area of the auditor computer interface 106 (e.g., the first set of review data response 506 as described herein with reference to FIG. 5).

At block 614, the server computing system 120 can control the AI Auditing System 126 to automatically generate a final draft report. For example, the server computing system 120 can automatically generate a final draft report by combining first set of review data, the generated anomaly alerts, and the generated fraud alerts into a final report template (e.g., that is stored in the datastore 122).

In some cases, the server computing system 120 may display the final draft report on a fourth portion of the auditor computer interface 106 (e.g., the final draft report 508 as described herein with reference to FIG. 5).

At block 616, the server computing system 120 can obtain, via a user interface of the computing resources 124, second review data indicative of an auditor's review of the generated final draft report. For example, the auditor may make minor changes to the final draft report (e.g., slight changes to align with the specific region's standards for auditing reports).

At block 618, the server computing system 120 can control the AI Auditing System 126 to modify the final draft report based on the second set of review data to generate a final report. For example, the server computing system 120 may update the final draft report with the region specific standards indicated in the second set of review data. In some cases, the AI Auditing System 126 may display an indication of that removal of a fifth area of the auditor computer interface 106 (e.g., the second set of review data response 510 as described herein with reference to FIG. 5).

Additionally, the server computing system 120 can display an indication of the generated final report on a sixth area of the user interface (e.g., the final report indication 512 as described herein with reference to FIG. 5). For example, an indication such as "the final report is ready" may be displayed on the screen of the auditor computer interface 106 and/or the user computing interface 102. In some cases, the sixth area of the user interface may be different from the first to fifth areas described above, such that the first to sixth areas may be disposed in the same display of the auditor computer interface 106 such that the information displayed in the first to sixth areas can be visible at the same time (e.g., via the same display screen of the auditor computer interface 106).

Figure 7:
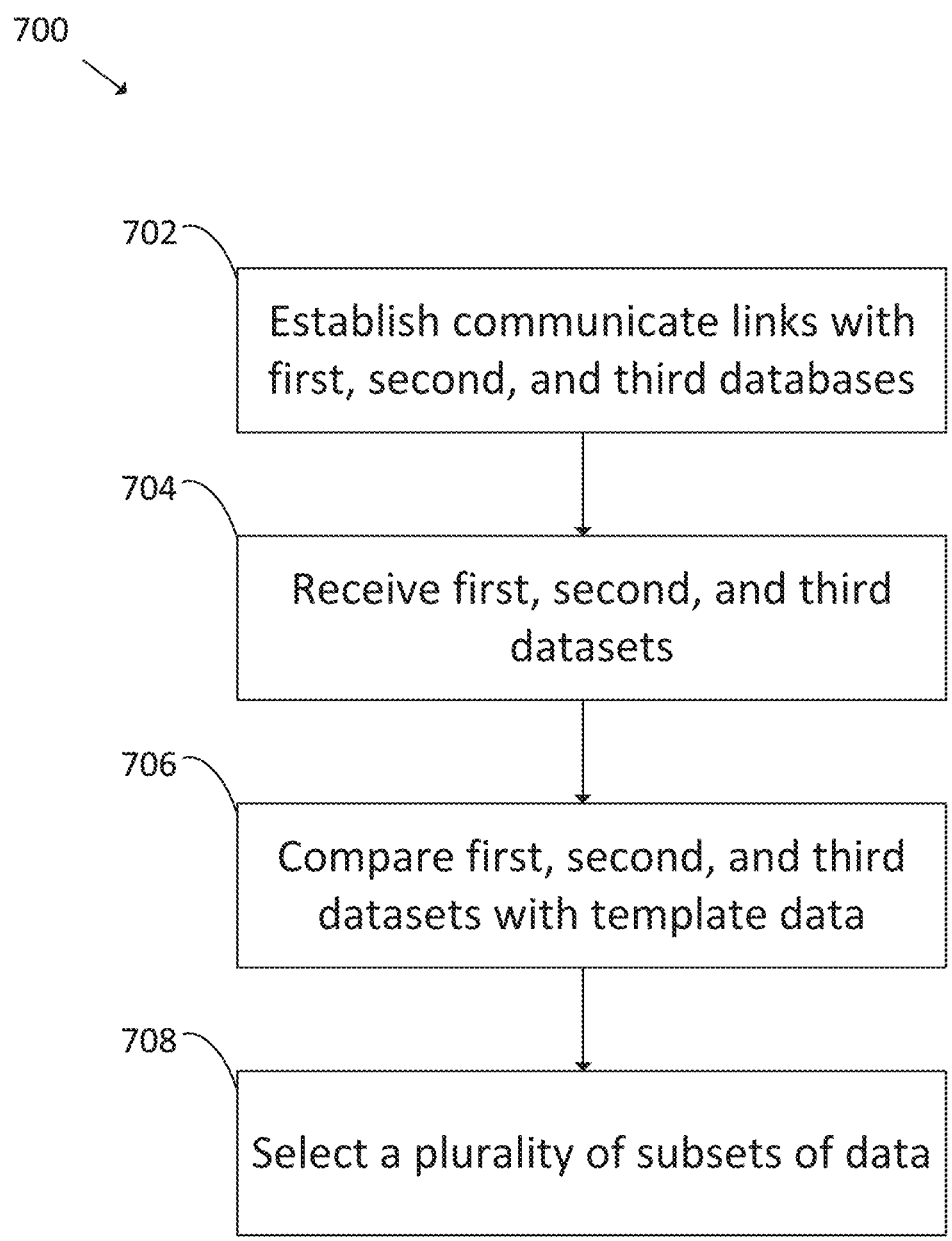

Referring to FIG. 7, process flow diagram 700 illustrates a method for obtaining subsets of financial data for the purposes of audit testing using the AI Auditing System 126. In some cases, process flow diagram 700 may be performed by the RPA module 202. For example, process flow diagram 700 may be performed by the RPA module 202 as described herein with reference to FIG. 2.

At block 702, the AI Auditing System 126 can control the RPA module 202 to establish communication links with a plurality of databases. For example, the RPA module 202 can establish a first communication link with a first database (e.g., the database 110 in FIG. 1) storing a first data set comprising past financial data of a first user (e.g., a client user), a second communication link with a second database (e.g., the database 112 in FIG. 1) storing a second data set comprising public financial information of the first user, and a third communication link with a user terminal of a second user (e.g., an auditor computer).

At block 704, the AI Auditing System 126 can control the RPA module 202 to receive, via a plurality of communication interfaces, the first, second, and third datasets. For example, the AI Auditing System 126 can receive, via a first communication interface (not shown in FIG. 1), the first dataset from the first database. The AI Auditing System 126 can also receive, by a second communication interface (not shown in FIG. 1) of the server 120, the second data set from the second database. The AI Auditing System 126 can also receive, by a third communication interface (not shown in FIG. 1) of the server 120, a third data set from the user terminal or the user computer interface 102, the third data set comprising current financial data of the first user. For example, the AI Auditing System 126 can send a first request to the user terminal of the first user for current year financial data, and may receive in response the third dataset.

At block 706, the AI Auditing System 126 can control the RPA module 202 to compare the first, second, and third datasets. For example, the RPA module 202 can compare the first, second, and third datasets with a plurality of different sets of template data. The plurality of different sets of template data may be stored in the datastore 122. In some cases, the plurality of different sets of template data may comprise a first set of template data and a second set of template data different from the first set of template data.

In some cases, the RPA module 202 may determine that the first user did not provide all of the financial data based on the comparison of the datasets with the plurality of different template data. For example, based on the comparison, the RPA module 202 may determine that payroll data required by the template data is missing in the third data set. In such examples, the RPA module 202 can send a second request to the user terminal of the first user for the missing data.

At block 708, the AI Auditing System 126 can control the RPA module 202 to select a plurality of subsets of data from each of the first data set, the second data set, and the third data set. The plurality of subsets of data may be similar to at least one of the plurality of different sets of template data and may have an image data format. For example, the RPA module 202 can select a subset of data from the plurality of subsets to be used as testing samples for the audit. In this example, the RPA module 202 may select subsets of data from general ledger, transaction entries, etc.

Figure 8:
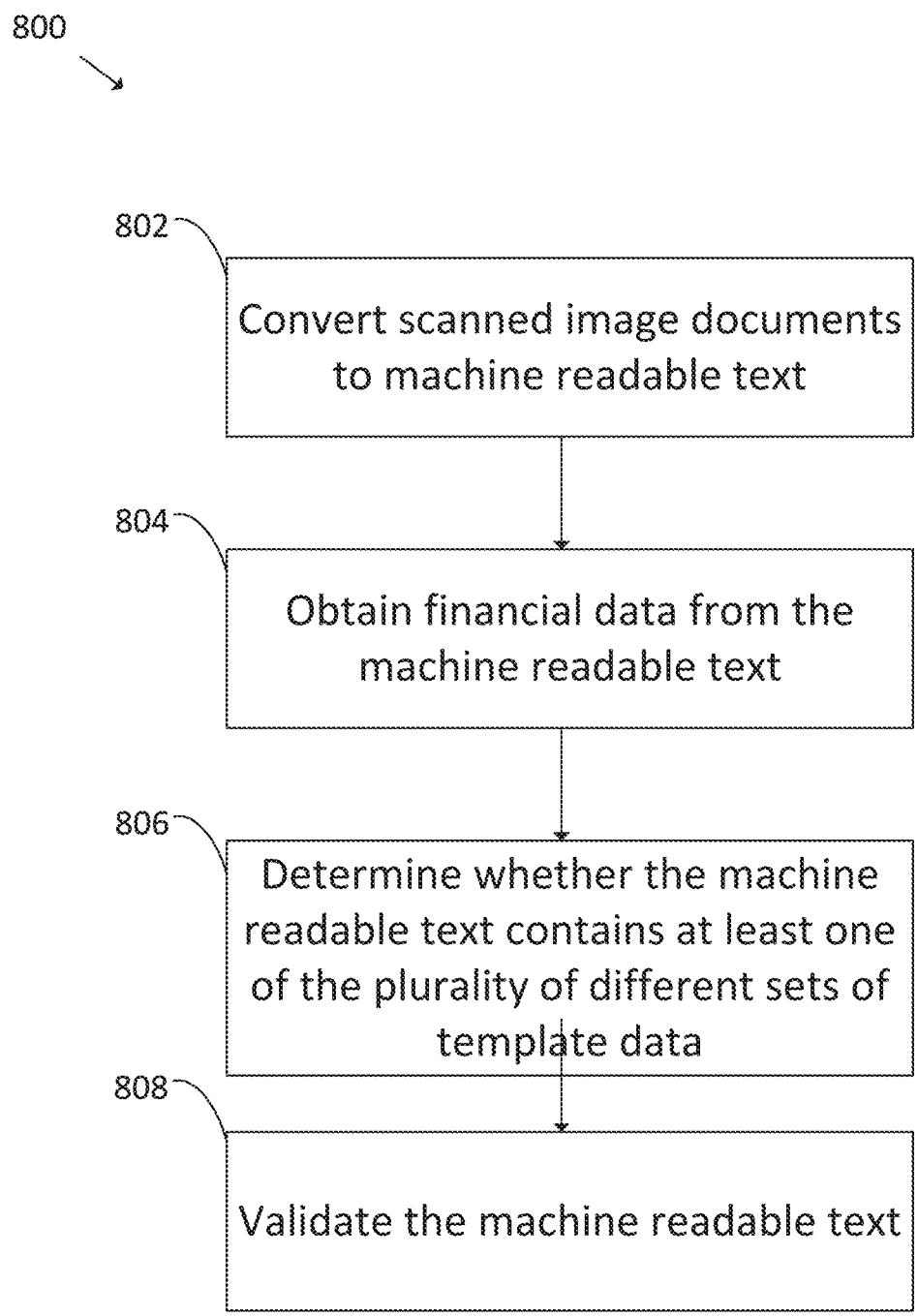

Referring to FIG. 8, process flow diagram 800 illustrates a method for converting scanned image documents to validated machine readable text using the AI Auditing System 126. In some cases, the process flow diagram 800 may be performed by the OCR Module 204. For example, process flow diagram 800 may be performed by the OCR Module 204 as described herein with reference to FIG. 2.

At block 802, the AI Auditing System 126 can control the OCR Module 204 to convert the selected plurality of subsets of data having the image data format into machine readable text. For example, the OCR Module 204 can obtain the selected plurality of subsets of data from the RPA module 202 (as described herein with reference to FIG. 6) and convert the scanned images into machine readable text.

In some cases, the machine readable test may comprise a first set of machine readable text associated with the first set of template data (e.g., the prior year financial data) and a second set of machine readable text associated with the second set of template data (e.g., the current year financial data).

At block 804, the AI Auditing System 126 can control the OCR Module 204 to obtain financial information from the machine readable text. For example, the OCR Module 204 can identify key financial information such as transactions, invoices, etc. from the machine readable text.

At block 806, the AI Auditing System 126 can control the OCR Module 204 to determine whether the machine readable text contains at least one of the plurality of different sets of template data. For example, the OCR Module 204 can compare the first set of machine readable text and the second set of machine readable text to the first and second set of template data to identify any missing financial data (e.g., data present in the template data but not in the machine readable text).

At block 808, based on a determination that the machine readable text does contain at least one of the plurality of different sets of template data, the AI Auditing System 126 can control the OCR Module 204 to validate the machine readable text. For example, the OCR Module 204 can determine that the first and second set of template data is present in the first and second set of machine readable text.

In some cases, if the OCR Module 204 determines that the machine readable text does not contain at least one of the plurality of different sets of template data, the AI Auditing System 126 can control the RPA module 202 to send a second request to the first user for the missing information.

Figure 9:
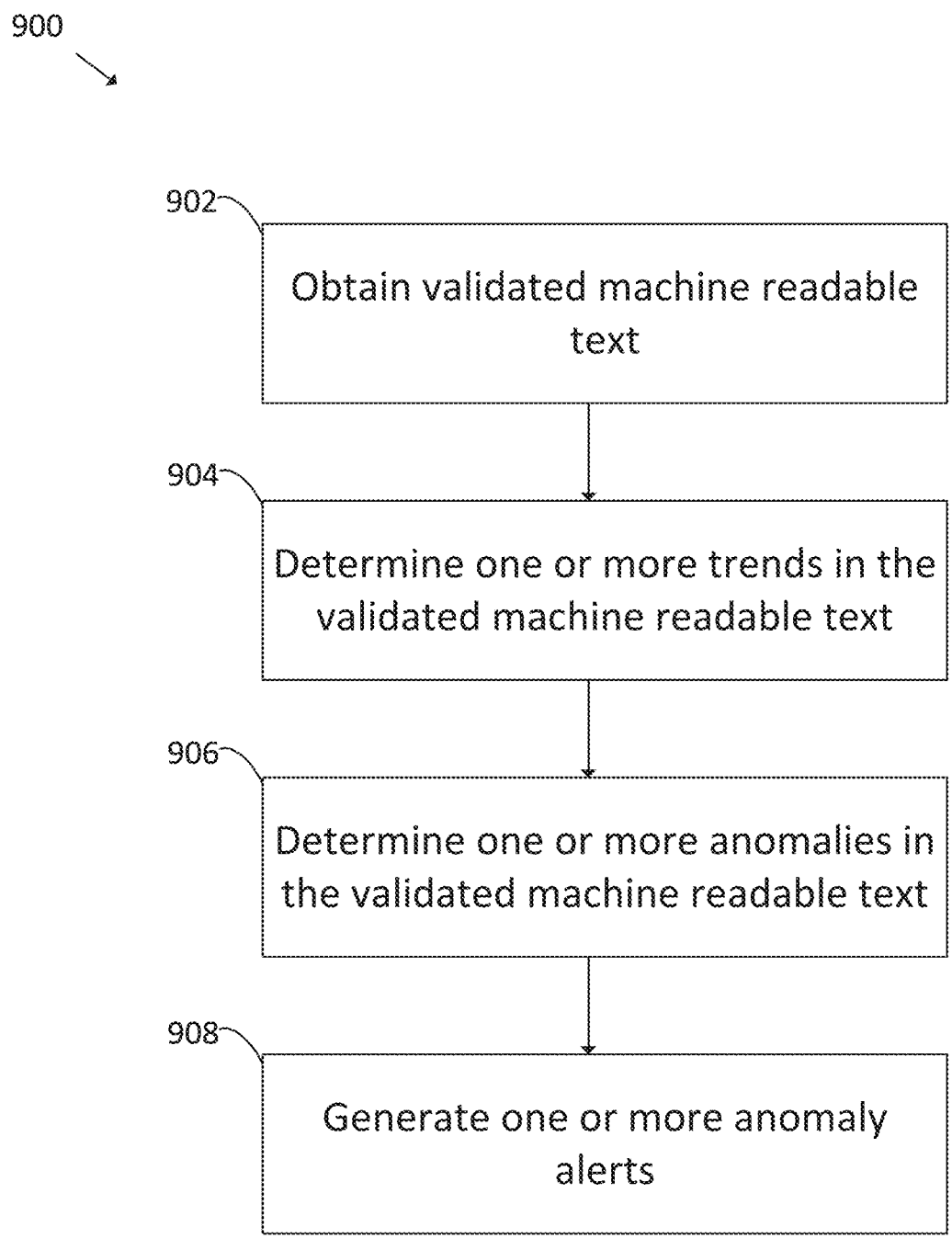

Referring to FIG. 9, process flow diagram 900 illustrates a method for generating one or more anomaly alerts using the AI Auditing System 126. In some cases, process flow diagram 900 may be performed by the predictive analytics module 206. For example, process flow diagram 900 may be performed by the predictive analytics module 206 as described herein with reference to FIG. 2.

At block 902, the AI Auditing System 126 can control the predictive analytics module 206 to obtain the validated machine readable text from the OCR Module 204. For example, the predictive analytics module 206 may select a first set of validated machine readable text from the validated machine readable text associated with the first set of template data and a second set of validated machine readable text from the validated machine readable text associated with the second set of template data.

At block 904, the AI Auditing System 126 can control the predictive analytics module 206 to determine one or more trends in the validated machine readable text. The process of determining one or more trends in the machine readable text is described in more detail herein with respect to FIG. 6.

At block 906, the AI Auditing System 126 can control the predictive analytics module 206 to determine one or more anomalies in the validated machine readable text. The process of determining one or more anomalies in the machine readable text is described in more detail herein with respect to FIG. 6.

At block 908, the AI Auditing System 126 can control the predictive analytics module 206 to generate an anomaly alert for each of the determined one or more anomalies. For example, an anomaly alert can be generated for a determined outlier transaction, as described in more detail herein.

Figure 10:
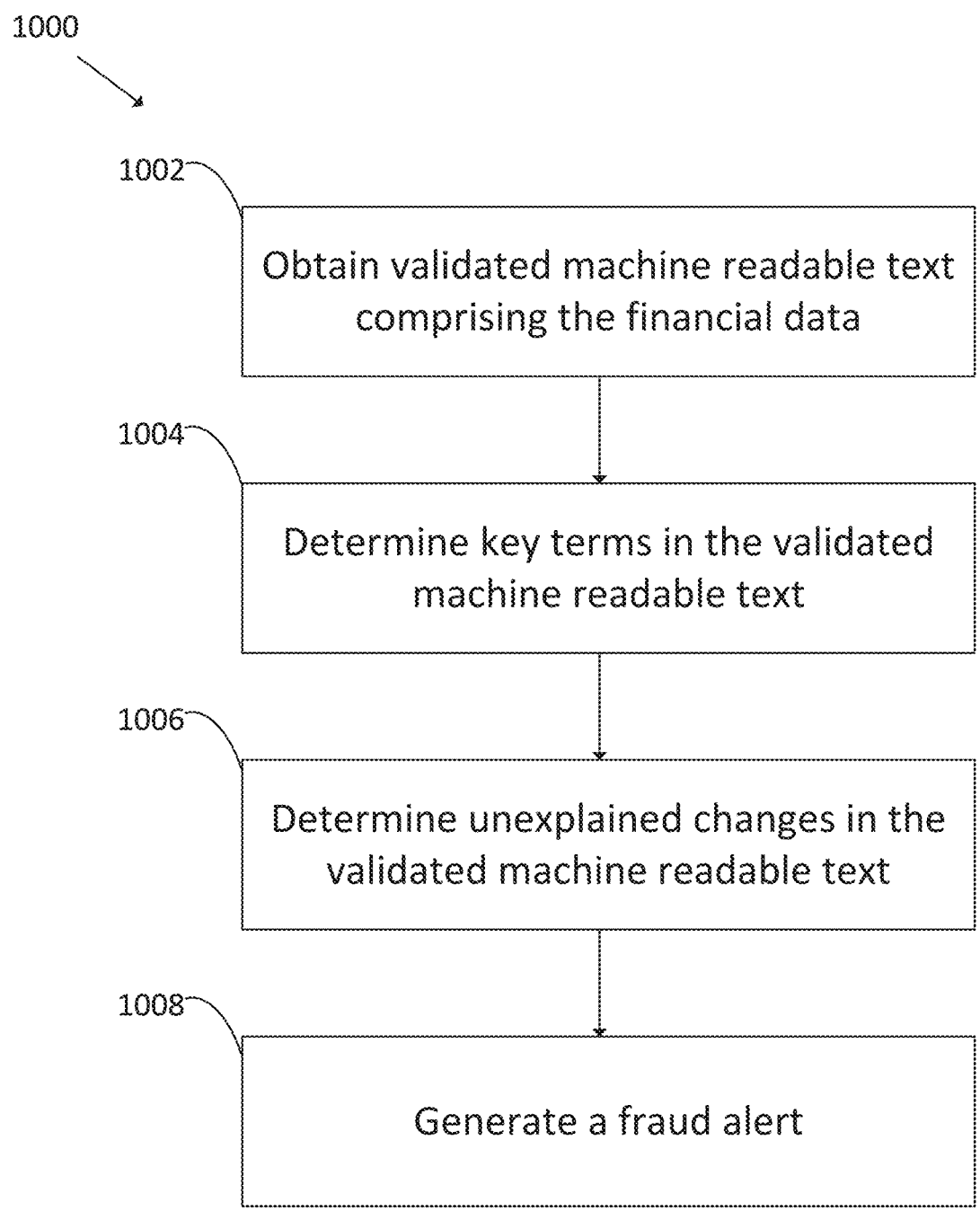

Referring to FIG. 10, process flow diagram 1000 illustrates a method for generating a fraud alert using the AI Auditing System 126. In some cases, process flow diagram 1000 may be performed by the NLP module 208. For example, process flow diagram 1000 may be performed by the NLP module 208 as described herein with reference to FIG. 2.

At block 1002, the AI Auditing System 126 can control the NLP module 208 to obtain the validated machine readable text containing the financial data. For example, the NLP module 208 can obtain, from the OCR Module 204, the converted and validated financial data.

At block 1004, the AI Auditing System 126 can control the NLP module 208 to scan the validated machine readable text to determine key terms. For example, the NLP module 208 may scan the validated machine readable text to determine key terms that are common indicators of fraud, such as "overstated revenue," "unexplained payment," etc.

In some cases, the AI Auditing System 126 can further control the NLP module 208 to scan the validated machine readable text to validate that the financial data complies with regulatory standards. For example, the NLP module 208 can scan the validated machine readable text to determine that the data complies with GARP, IFRS, SOX, and/or any other regulatory standard.

At block 1006, the AI Auditing System 126 can control the NLP module 208 to determine a fraud indicator based at least in part on one or more unexplained changes in the data, as described herein with reference to FIG. 6. For example, the NLP module 208 can identify inconsistent data in the validated machine readable text based on a comparison of the first set of validated machine readable text and the second set of validated machine readable text.

At block 1008, the AI Auditing System 126 can control the NLP module 208 to generate a fraud alert for each of the determined one or more fraud indicators determined in blocks 1004 and 1006. For example, a fraud alert may be generated for each key term identified in the validated machine readable text.

Figure 11:
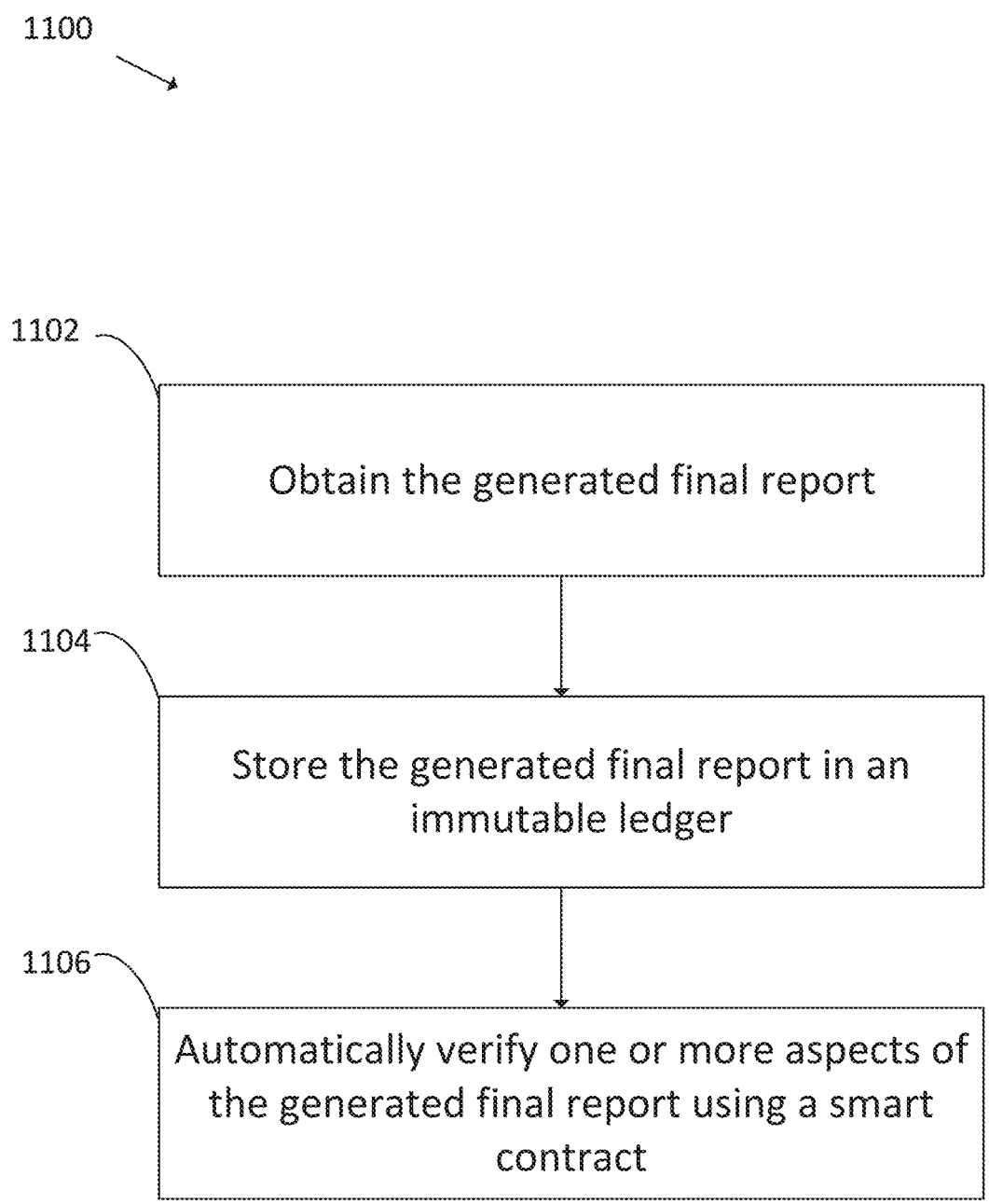

Referring now to FIG. 11, process flow diagram 1100 illustrates a method for storing and verifying the final audit report in a blockchain. In some cases, process flow diagram 1100 may be performed by the AI Auditing System 126 in communication with the blockchain network 108 as described herein with reference to FIG. 1.

At block 1102, the AI Auditing System 126 can communicate the generated final report to the blockchain network 108 via the network. At block 1104, the AI Auditing System 126 can instruct the blockchain network 108 to store the generated final report in the blockchain. For example, the blockchain network 108 may store the generated final report in a decentralized ledger so that the report is unalterable and secure.

At block 1106, the AI Auditing System 126 can control the blockchain network 108 to generate a smart contract that automatically verifies one or more aspects of the generated final report. For example, the AI Auditing System 126 can create a smart contract that verifies that first data in the generated final report is compliant with regulatory standards. Once the smart contract verifies the first data, the smart contract can then begin verifying second data in the generated final report. In this example, the smart contract can ensure that the entirety of the final report is compliant.

Additional Embodiments

Example summary of a computer-implemented method present in certain embodiments may include the following subprocesses:
Data Ingestion and Validation
Receiving datasets including past, public, and client financial data;
Comparing the datasets against stored templates;
Selecting subsets of audit-relevant data;
Converting subsets from image format into machine readable text via OCR;
Validating the text against templates;
Generating validated text for audit analysis.
Fraud and Anomaly Detection
Receiving validated machine readable text;
Applying predictive analytics to identify trends or inconsistencies;
Applying NLP to detect fraud indicators including anomalies, outliers, or violations of rules;
Generating anomaly and fraud alerts;
Transmitting alerts to an auditor interface.
Multi-Panel UI and Report Generation
Displaying anomaly alerts in a first panel and fraud alerts in a second panel;
Incorporating auditor review feedback into a third panel;
Generating a draft audit report and displaying it in a fourth panel;
Receiving additional review data, updating the draft, and generating a final audit report;
Displaying confirmation of the final audit report in a sixth panel;
Wherein simultaneous multi-panel display reduces computation and improves efficiency.

Additionally or alternatively, an example summary of a system present in certain embodiments may include the following:
System for Data Ingestion and Validation
Receive past, public, and client datasets;
Compare datasets to templates;
Convert subsets into machine readable text via OCR;
Validate the text;
Store validated data for audit processing.
System for Fraud and Anomaly Detection
Analyze validated text with predictive analytics and NLP;
Detect anomalies and fraud indicators;
Generate alerts;
Transmit alerts to an auditor interface.
System for Multi-Panel UI and Report Generation
Display alerts in first and second panels;
Collect auditor review feedback in a third panel;
Generate draft reports in a fourth panel;
Update and finalize reports;
Display report confirmation in a sixth panel;
Wherein simultaneous panel display improves resource efficiency.

Additionally or alternatively, an example summary of a non-transitory, computer-readable medium (CRM) present in certain embodiments may include the following:
CRM for Data Ingestion and Validation
Instructions cause processors to ingest, convert, validate, and store financial data as machine readable text.
CRM for Fraud and Anomaly Detection
Instructions cause processors to apply analytics, detect fraud indicators, and generate alerts.
CRM for Multi-Panel UI and Report Generation
Instructions cause processors to display multi-panel alerts, incorporate auditor review, and generate final reports Additional Considerations The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

As is also stated above, it should be noted that the use of particular terminology when describing certain features or aspects should not be taken to imply that the terminology is being re-defined herein to be restricted to including any specific characteristics of the features or aspects of the technology with which that terminology is associated. Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The phrase "based on" does not mean "based only on," unless expressly specified otherwise. In other words, the phrase "based on" describes both "based only on" and "based at least on." Unless otherwise explicitly stated, articles such as "a" or "an" should generally be interpreted to include one or more described items. Accordingly, phrases such as "a device configured to" are intended to include one or more recited devices.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description also discloses methods and materials of the present application. The devices described herein may be susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A computer-implemented method to be performed by a server for displaying data sets on a user interface, the method comprising:

storing, in a memory of the server, a final report template and a plurality of templates respectively comprising a plurality of different sets of template data, the plurality of different sets of template data comprising a first set of template data and a second set of template data different from the first set of template data;

providing a first database storing a first data set comprising past financial data of a first user;

establishing a first communication link with a second database storing a second data set comprising public financial information of the first user;

receiving, by a first communication interface of the server, the second data set from the second database;

establishing a second communication link with a user terminal of the first user;

receiving, by a second communication interface of the server, a third data set from the user terminal, the third data set comprising current financial data of the first user;

comparing, by a processor of the server, the plurality of different sets of template data with the first data set, the second data set, and the third data set;

selecting, by the processor, a plurality of subsets of data from each of the first data set, the second data set, and the third data set that are similar to at least one of the plurality of different sets of template data, the plurality of subsets of data having an image data format;

converting, by the processor, the selected plurality of subsets of data having the image data format into machine readable text, the machine readable text comprising a first set of machine readable text associated with the first set of template data and a second set of machine readable text associated with the second set of template data;

determining whether the machine readable text contains at least one of the plurality of different sets of template data;

in response to determining that the machine readable text contains at least one of the plurality of different sets of template data, validating the machine readable text;

selecting, by the processor, a first set of validated machine readable text from the validated machine readable text associated with the first set of template data and a second set of validated machine readable text from the validated machine readable text associated with the second set of template data;

determining, by the processor, one or more trends in the validated machine readable text based on a comparison of the first set of validated machine readable text and the second set of validated machine readable text, wherein the one or more trends include:
  one or more changes over time between the first set of validated machine readable text and the second set of validated machine readable text, or
  one or more inconsistencies between the first set of validated machine readable text and the second set of validated machine readable text;

determining, by the processor, one or more anomalies in the validated machine readable text, wherein determining the one or more anomalies comprises:
  determining, by the processor, outlier data from the validated machine readable text, wherein the outlier data is selected from the one or more changes or one or more inconsistencies above a threshold, and
  determining, by the processor, inconsistent data from the validated machine readable text, wherein the inconsistent data is inconsistent with a set of predetermined rules;

determining, by the processor, one or more fraud indicators in the validated machine readable text, the one or more fraud indicators containing data that is associated with fraud or the determined one or more trends includes an unexplained change in the data;

generating, by the processor, an anomaly alert for each of the determined one or more anomalies;

generating, by the processor, a fraud alert for each of the determined one or more fraud indicators;

displaying, by the processor, the anomaly alerts on a first area of the user interface;

displaying, by the processor, the fraud alerts on a second area of the user interface, wherein the second area of the user interface is different than the first area;

receiving a first set of review data, by a third communication interface of the server, from an auditor computer;

incorporating the first set of review data into a third area of the user interface different from the first and second areas;

based on a final report template, automatically generating, by the processor, a final draft report by combining the first set of review data, the anomaly alerts, and the fraud alerts in the final report template;

incorporating the final draft report into a fourth area of the user interface different from the first, second, and third areas;

receiving a second set of review data by the user interface from the auditor computer;

modifying the final draft report based on the second set of review data to generate final report;

incorporating the second set of review data into a fifth area of the user interface different from the first to fourth areas; and displaying an indication of the generated final report on a sixth area of the user interface different from the first to fifth areas, wherein at least the first, second, fourth, and sixth areas are disposed in a same display screen of the user interface such that information contained in the first, second, fourth, and sixth areas are simultaneously visible via the same display screen.

2. The method of claim 1, wherein the third and the fifth areas are simultaneously visible via the same display screen as the first, second, fourth, and sixth areas.

3. The method of claim 2, wherein at least two of the first to sixth areas are arranged horizontally, vertically, or diagonally in the same display screen.

4. The method of claim 2, wherein at least two of the first to sixth areas have different sizes or shapes, wherein one or more of the first to sixth areas are dynamically resized to adapt to the user interface.

5. The method of claim 1, wherein determining the one or more trends in the validated machine readable text further comprises:
  determining, by the processor, one or more future trends in the validated machine readable text based on the comparison of the first set of validated machine readable text and the second set of validated machine readable text, wherein the one or more future trends include one or more predicted future misstatements and one or more predicted inconsistent responses.

6. The method of claim 1, further comprising:
  storing the generated final report in a blockchain ledger on a blockchain network, wherein the blockchain ledger secures the generated final report in a decentralized ledger that cannot be altered; and
  automatically verifying one or more aspects of the final report in the blockchain ledger using a smart contract on the blockchain network, wherein the smart contract is configured to verify a first aspect of the one or more aspects of the final report before verifying a second aspect.

7. The method of claim 1, wherein the data that is associated with fraud includes at least one of unexplained payment, overstated revenue, or mistyped vendor names.

8. The method of claim 1, wherein selecting the outlier data from the one or more inconsistencies above a threshold comprises selecting a transaction that is 20% larger compared to a next highest transaction.

9. The method of claim 1, further comprising:
  determining, based on a comparison of the third data set and the plurality of different sets of template data, a set of missing data, the set of missing data comprising current financial data of the first user in the plurality of different sets of template data and not in the third data set;
  establishing a third communication link with the user terminal of the first user; and
  receiving, by the second communication interface of the server, an updated third data set from the user terminal, the updated third data set comprising the current financial data of the first user in the plurality of different sets of template data and not in the third data set.

10. The method of claim 1, wherein validating the machine readable text comprises validating the machine readable text against general reporting standards including one or more of generally accepted accounting principles, International Financial Reporting Standards, and Sarbanes-Oxley Act.

11. The method of claim 1, further comprising:
  in response to determining that the machine readable text does not contain at least one of the plurality of different sets of template data, receiving, by the second communication interface of the server, a fourth data set from the user terminal, the fourth data set comprising updated current financial data of the first user.

12. The method of claim 1, wherein inconsistent data that is inconsistent with a set of predetermined rules comprises one or more of data obtained from a mistyped vendor name, duplicate data, or data received on a weekend.

13. The method of claim 1, further comprising a machine learning model, the method further comprising:
   storing the determined one or more anomalies in a datastore associated with the machine learning model; and
   training the machine learning model based on the stored one or more anomalies.

14. A non-transitory computer readable recording medium for storing instructions, when executed by one or more processors, that cause the one or more processors to perform the method of claim 1.

15. A system on a server for displaying data sets on a user interface, the system comprising:
   one or more processors; and
   one or more non-transitory computer-readable media storing instructions which, when executed by the one or more processors, cause the one or more processors to:
      store, in a memory of the server, a final report template and a plurality of templates respectively comprising a plurality of different sets of template data, the plurality of different sets of template data comprising a first set of template data and a second set of template data different from the first set of template data;
   provide a first database storing a first data set comprising past financial data of a first user;
      establish a first communication link with a second database storing a second data set comprising public financial information of the first user;
      receive, by a first communication interface of the server, the second data set from the second database;
      establish a second communication link with a user terminal of the first user;
      receive, by a second communication interface of the server, a third data set from the user terminal, the third data set comprising current financial data of the first user;
      compare, by a processor of the server, the plurality of different sets of template data with the first data set, the second data set, and the third data set;
      select, by the processor, a plurality of subsets of data from each of the first data set, the second data set, and the third data set that are similar to at least one of the plurality of different sets of template data, the plurality of subsets of data having an image data format;
      convert, by the processor, the selected plurality of subsets of data having the image data format into machine readable text, the machine readable text comprising a first set of machine readable text associated with the first set of template data and a second set of machine readable text associated with the second set of template data;
      determine whether the machine readable text contains at least one of the plurality of different sets of template data;
      in response to determining that the machine readable text contains at least one of the plurality of different sets of template data, validate the machine readable text;
      select, by the processor, a first set of validated machine readable text from the validated machine readable text associated with the first set of template data and a second set of validated machine readable text from the validated machine readable text associated with the second set of template data;
      determine, by the processor, one or more trends in the validated machine readable text based on a comparison of the first set of validated machine readable text and the second set of validated machine readable text, wherein the one or more trends include:
         one or more changes over time between the first set of validated machine readable text and the second set of validated machine readable text, or
         one or more inconsistencies between the first set of validated machine readable text and the second set of validated machine readable text;
      determine, by the processor, one or more anomalies in the validated machine readable text, wherein determining the one or more anomalies comprises:
         determine, by the processor, outlier data from the validated machine readable text, wherein the outlier data is selected from the one or more changes or one or more inconsistencies above a threshold, and
         determine, by the processor, inconsistent data from the validated machine readable text, wherein the inconsistent data is inconsistent with a set of predetermined rules;
      determine, by the processor, one or more fraud indicators in the validated machine readable text, the one or more fraud indicators containing data that is associated with fraud or the determined one or more trends includes an unexplained change in the data;
      generate, by the processor, an anomaly alert for each of the determined one or more anomalies;
      generate, by the processor, a fraud alert for each of the determined one or more fraud indicators;
      display, by the processor, the anomaly alerts on a first area of the user interface;
      display, by the processor, the fraud alerts on a second area of the user interface, wherein the second area of the user interface is different than the first area;
      receive a first set of review data, by a third communication interface of the server, from an auditor computer;
      incorporate the first set of review data into a third area of the user interface different from the first and second areas;
      based on a final report template, automatically generate, by the processor, a final draft report by combining the first set of review data, the anomaly alerts, and the fraud alerts in the final report template;
      incorporate the final draft report into a fourth area of the user interface different from the first, second, and third areas;
      receive a second set of review data by the user interface from the auditor computer;
      modify the final draft report based on the second set of review data to generate final report;
      incorporate the second set of review data into a fifth area of the user interface different from the first to fourth areas; and
      display an indication of the generated final report on a sixth area of the user interface different from the first to sixth areas, wherein at least the first, second, fourth, and sixth areas are disposed in a same display screen of the user interface such that information contained in the first, second, fourth, and sixth areas are simultaneously visible via the same display screen.

16. The system of claim 15, wherein the third and the fifth areas are simultaneously visible via the same display screen as the first, second, fourth, and sixth areas.

17. The system of claim 16, wherein at least two of the first to sixth areas are arranged horizontally, vertically, or diagonally in the same display screen.

18. The system of claim 17, wherein at least two of the first to sixth areas have different sizes or shapes, wherein one or more of the first to sixth areas are dynamically resized to adapt to the user interface.

19. The system of claim 15, wherein to determine the one or more trends in the validated machine readable text, the one or more processors are further configured to:
  determine one or more future trends in the validated machine readable text based on the comparison of the first set of validated machine readable text and the second set of validated machine readable text, wherein the one or more future trends include one or more predicted future misstatements and one or more predicted inconsistent responses.

20. The system of claim 15, wherein the one or more processors are further configured to:
  store the generated final report in a blockchain ledger on a blockchain network, wherein the blockchain ledger secures the generated final report in a decentralized ledger that cannot be altered; and
  automatically verify one or more aspects of the final report in the blockchain ledger using a smart contract on the blockchain network, wherein the smart contract is configured to verify a first aspect of the one or more aspects of the final report before verifying a second aspect.

* * * * *